United States Patent
Amano et al.

(10) Patent No.: US 9,319,698 B2
(45) Date of Patent: *Apr. 19, 2016

(54) IMAGE DECODING APPARATUS FOR DECODING A TARGET BLOCK BY REFERENCING INFORMATION OF AN ALREADY DECODED BLOCK IN A NEIGHBORHOOD OF THE TARGET BLOCK

(71) Applicant: Panasonic Intellectual Property Management Co., Ltd., Osaka (JP)

(72) Inventors: Hiroshi Amano, Osaka (JP); Masayasu Iguchi, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/499,903

(22) Filed: Sep. 29, 2014

(65) Prior Publication Data

US 2015/0016507 A1    Jan. 15, 2015

Related U.S. Application Data

(62) Division of application No. 12/669,591, filed as application No. PCT/JP2009/002248 on May 21, 2009, now Pat. No. 8,897,583.

(30) Foreign Application Priority Data

May 23, 2008  (JP) .................... 2008-135133

(51) Int. Cl.
*G06K 9/36*     (2006.01)
*H04N 19/177*   (2014.01)
(Continued)

(52) U.S. Cl.
CPC ....... *H04N 19/177* (2014.11); *H04N 19/00278* (2013.01); *H04N 19/00903* (2013.01);
(Continued)

(58) Field of Classification Search
CPC ....... H04N 7/30; H04N 7/50; H04N 7/26244; H04N 7/26755
USPC ......... 345/505; 370/202; 375/240.03, 240.12, 375/240.13, 240.14, 240.16, 240.24, 375/240.25, 240.29; 382/239
See application file for complete search history.

(56) References Cited

U.S. PATENT DOCUMENTS 7,720,153 B2   5/2010   Sugimoto et al.
7,881,542 B2   2/2011   Kashima et al.
(Continued)

FOREIGN PATENT DOCUMENTS

CN    1535024     10/2004
EP    1 213 928    6/2002
(Continued)

OTHER PUBLICATIONS

International Search Report issued Aug. 25, 2009 in International (PCT) Application No. PCT/JP2009/002248.
(Continued)

*Primary Examiner* — Vikkram Bali
*Assistant Examiner* — Xuemei Chen
(74) *Attorney, Agent, or Firm* — Wenderoth, Lind & Ponack, L.L.P.

(57) ABSTRACT

To provide an image decoding apparatus that suppresses overhead of parallel processing to improve parallelization efficiency and reduce circuit costs, while solving neighboring macroblock dependencies. The image decoding apparatus (100) includes first and second decoding circuits (101, 102) having a transfer unit that transfers right neighborhood information or left neighborhood information, and first and second transfer completion detection units (104, 105) that respectively detect whether or not the left neighborhood information or the right neighborhood information has been transferred to the first and second decoding circuits (101, 102). Each of the first and second decoding circuits (101, 102) decodes a decoding target macroblock positioned at an edge of a region, when the transfer of the left neighborhood information or the right neighborhood information is detected. A boundary line between regions is orthogonal to a decoding direction corresponding to an order in which macroblocks adjacent to each other are sequentially decoded.

3 Claims, 18 Drawing Sheets

(51) Int. Cl.

| | | |
|---|---|---|
| *H04N 19/176* | (2014.01) | |
| *H04N 19/61* | (2014.01) | |
| *H04N 19/44* | (2014.01) | |
| *H04N 19/436* | (2014.01) | |
| *H04N 19/55* | (2014.01) | |
| *H04N 19/107* | (2014.01) | |
| *H04N 19/85* | (2014.01) | |

(52) U.S. Cl.
CPC ........... *H04N19/107* (2014.11); *H04N 19/176* (2014.11); *H04N 19/436* (2014.11); *H04N 19/44* (2014.11); *H04N 19/55* (2014.11); *H04N 19/61* (2014.11); *H04N 19/85* (2014.11)

(56) References Cited

U.S. PATENT DOCUMENTS

| | | | |
|---|---|---|---|
| 8,184,700 | B2 | 5/2012 | Komi et al. |
| 8,184,715 | B1 | 5/2012 | Rosenweig et al. |
| 8,457,212 | B2 | 6/2013 | Mitani et al. |
| 8,971,401 | B2 * | 3/2015 | Yamaguchi .................. 375/240 |
| 2004/0233991 | A1 | 11/2004 | Sugimoto et al. |
| 2005/0123207 | A1 | 6/2005 | Marpe et al. |
| 2006/0093043 | A1 | 5/2006 | Kashima et al. |
| 2007/0047660 | A1 | 3/2007 | Mitani et al. |
| 2007/0097850 | A1 | 5/2007 | Park et al. |
| 2007/0098070 | A1 | 5/2007 | Saigo et al. |
| 2007/0183508 | A1 | 8/2007 | Kudo et al. |
| 2007/0253491 | A1 | 11/2007 | Ito et al. |
| 2007/0274398 | A1 | 11/2007 | Caulk |
| 2008/0056364 | A1 | 3/2008 | Lyashevsky et al. |
| 2008/0056389 | A1 | 3/2008 | Chiang et al. |
| 2008/0069244 | A1 | 3/2008 | Yano |
| 2008/0123750 | A1 | 5/2008 | Bronstein et al. |
| 2008/0159408 | A1 | 7/2008 | Degtyarenko |
| 2008/0225948 | A1 | 9/2008 | Lin et al. |
| 2008/0240254 | A1 | 10/2008 | Au et al. |
| 2008/0291999 | A1 | 11/2008 | Lerouge et al. |
| 2008/0298472 | A1 | 12/2008 | Jain et al. |
| 2009/0110077 | A1 | 4/2009 | Amano et al. |
| 2009/0122869 | A1 | 5/2009 | Huang et al. |
| 2009/0154572 | A1 | 6/2009 | Baik et al. |
| 2009/0245349 | A1 | 10/2009 | Zhao et al. |
| 2009/0268821 | A1 | 10/2009 | Au et al. |
| 2010/0027680 | A1 | 2/2010 | Segall et al. |
| 2010/0066748 | A1 | 3/2010 | Bivolarski et al. |
| 2010/0067582 | A1 | 3/2010 | Muller et al. |
| 2010/0086036 | A1 | 4/2010 | Jeon et al. |
| 2011/0058611 | A1 | 3/2011 | Sugimoto et al. |
| 2011/0235716 | A1 | 9/2011 | Tanaka et al. |
| 2012/0189067 | A1 | 7/2012 | Dang |
| 2012/0230424 | A1 | 9/2012 | Duvivier |
| 2012/0307907 | A1 | 12/2012 | Joch et al. |
| 2013/0272370 | A1 * | 10/2013 | Coban et al. ............. 375/240.01 |
| 2014/0105293 | A1 * | 4/2014 | George et al. ............. 375/240.12 |
| 2014/0133581 | A1 * | 5/2014 | Naito ....................... 375/240.26 |

FOREIGN PATENT DOCUMENTS

| | | |
|---|---|---|
| JP | 07-162858 | 6/1995 |
| JP | 08-046974 | 2/1996 |
| JP | 09-294262 | 11/1997 |
| JP | 10-327416 | 12/1998 |
| JP | 2000-295616 | 10/2000 |
| JP | 2006-129285 | 5/2006 |
| JP | 2006-295721 | 10/2006 |
| JP | 2007-060487 | 3/2007 |
| JP | 2007-251605 | 9/2007 |
| JP | 2007-251865 | 9/2007 |
| JP | 2009-246539 | 10/2009 |

OTHER PUBLICATIONS

ISO/IEC 13818-2, MPEG-2 Recommendation ITU-T H.262 (1995).

ISO/IEC 14496-2, MPEG-4 Information technology—Coding of audio-visual objects—Part 2, Visual, Second edition, Dec. 1, 2001.

ISO/IEC 14496-10, H.264/MPEG-4 AVC, Information technology—Coding of audio-visual objects—Part 10: Advanced Video Coding, Second edition, Oct. 1, 2004.

SMPTE 421M-2006, VC-1 Compressed Video Bitstream Format and Decoding Process, Feb. 2006.

S. Sun et al., "A highly efficient parallel algorithm for H.264 encoder based on macro-block region partition", In Proc. of the 3$^{rd}$ Intl. Conf. on High Performance Computing and Communications, pp. 577-585, Sep. 2007.

Y. Yoshihara, "Image data processing apparatus, image data processing method, program for image data processing method, and recording medium recording program for image data processing method", English translation of Japanese Patent Publication 2007-251865, published Sep. 27, 2007.

Z. Zhao et al., "Data partition for front-wave parallelization of H.264 decoding", Proceedings 2006 IEEE International Symposium on Circuits and Systems, May 2006.

F.H. Seitner et al., "Evaluation of data-parallel splitting approaches for H.264 decoding", Conference on Advances in Mobile Multimedia—MoMM, Nov. 2008.

Office Action and Search Report mailed Sep. 30, 2014 in corresponding Chinese Application No. 201210380168.0, with partial English translation.

* cited by examiner

IMAGE DECODING APPARATUS FOR DECODING A TARGET BLOCK BY REFERENCING INFORMATION OF AN ALREADY DECODED BLOCK IN A NEIGHBORHOOD OF THE TARGET BLOCK

TECHNICAL FIELD

The present invention relates to an image decoding apparatus and an image coding apparatus that respectively decode and code moving image information, and in particular relates to an image decoding apparatus that performs decoding by parallel processing and an image coding apparatus that performs coding by parallel processing.

BACKGROUND ART

An MPEG (Motion Pictures Experts Group) coding system that uses inter-frame differences is often employed as a technique for compression-coding (hereafter simply referred to as "coding") moving image information. As the MPEG coding system, in addition to conventionally used MPEG-2 (ISO/IEC 13818-2) and MPEG-4 (ISO/IEC 14496-2), new coding systems such as H.264/MPEG-4 AVC (ISO/IEC 14496-10) (hereafter simply referred to as "H.264") and VC-1 (SMPTE 421M) are increasingly used in recent years.

In such coding systems, one screen (picture) is divided into blocks each of which is made up of a predetermined number of pixels (luminance components: 16 pixels×16 pixels), and a decoding process or a coding process is performed on a block-by-block basis. This block is called a macroblock.

FIG. 18 is a diagram showing adjacent macroblock dependencies in H.264. In new coding systems represented by H.264, when coding a macroblock, correlation between the coding target macroblock and its neighboring macroblocks is exploited to enhance compression efficiency. Therefore, in order to decode or code an arbitrary macroblock MB10, it is necessary to reference processing results of four adjacent macroblocks, namely, a left adjacent macroblock MB11, an above left adjacent macroblock MB12, an above adjacent macroblock MB13, and an above right adjacent macroblock MB14 that are adjacent to the macroblock MB10, as shown in FIG. 18. This requires these adjacent macroblocks MB11 to MB14 to be decoded or coded beforehand.

Moreover, an image decoding apparatus or an image coding apparatus that executes a decoding process or a coding process in parallel by using a plurality of decoding units or a plurality of coding units that decode or code macroblocks (hereafter, these decoding units or coding units are simply referred to as "macroblock processing units") is proposed for a high-speed decoding process or coding process. In such an image decoding apparatus or image coding apparatus, the aforementioned adjacent macroblock dependencies need to be solved not by an individual macroblock processing unit but through cooperation between a plurality of macroblock processing units operating in parallel. Accordingly, methods for solving the dependencies are conventionally proposed (for example, see Patent Reference 1).

FIG. 19 is a diagram showing a processing procedure of an image decoding apparatus and an image coding apparatus described in Patent Reference 1 mentioned above. In FIG. 19, the numbers assigned to macroblocks MB indicate a processing order of macroblocks MB in a picture Pic, where macroblocks MB with the same number are processed in parallel. As shown in FIG. 19, the image decoding apparatus and the image coding apparatus start processing from a top left macroblock MB in the picture Pic. In the case of processing an arbitrary macroblock MB, this macroblock MB and a macroblock MB positioned one row below and two columns to the left of the macroblock MB are processed in parallel, thereby solving the aforementioned adjacent macroblock dependencies.

Which is to say, to process (decode or code) a macroblock MB, information showing processing results of adjacent macroblocks MB that are adjacent left, above left, above, and above right to the processing target macroblock MB is necessary due to the aforementioned dependencies. However, in the case of processing each row (macroblock line) of the picture Pic in parallel, simply processing macroblocks MB positioned in the same column of the different rows in parallel makes it impossible to obtain information on adjacent macroblocks MB necessary for each processing target macroblock MB, so that such parallel processing cannot be achieved. In view of this, in the image decoding apparatus and the image coding apparatus in Patent Reference 1 mentioned above, the column in which the processing target macroblock MB is positioned is made different in each row, thereby processing each row of the picture Pic in parallel.

Thus, by setting the position (column) of the processing target macroblock for each of the macroblock processing units operating in parallel, processing of each adjacent macroblock of the processing target macroblock MB can always be completed beforehand. This enables the aforementioned adjacent macroblock dependencies to be solved, with it being possible to achieve parallel processing for each row of the picture Pic.

PRIOR ART REFERENCES

Patent References

Patent Reference 1: Japanese Unexamined Patent Application Publication No. 2007-251865

SUMMARY OF THE INVENTION

Problems that Invention is to Solve

However, in the image decoding apparatus and the image coding apparatus described in Patent Reference 1 mentioned above, frequent mutual communication between the macroblock processing units is necessary to solve the aforementioned dependencies. This causes a problem of an increase in decoding or coding overhead and a decrease in parallelization efficiency. In detail, each time a macroblock processing unit processes a macroblock, the macroblock processing unit needs to transfer a result of the processing to another macroblock processing unit. This causes large processing overhead, and increases realization difficulty. Besides, a macroblock processing unit needs to be provided for each row of macroblocks, and each macroblock processing unit requires a memory for storing and transferring processing results. As a result, a memory size for holding processing results as adjacent macroblock information increases in the whole image decoding apparatus or image coding apparatus. Hence, there is also a problem of an increase in circuit cost.

The present invention has been developed in view of these problems, and has an object of providing an image decoding apparatus, an image coding apparatus, an image decoding method, and an image coding method that suppress overhead of parallel processing to improve parallelization efficiency and reduce circuit costs, while solving dependencies on neighboring macroblock information which are seen in new coding systems represented by H.264.

Means to Solve the Problems

To achieve the stated object, an image decoding apparatus according to the present invention is an image decoding apparatus that decodes a coded picture composed of blocks, on a block-by-block basis, the image decoding apparatus including: a plurality of decoding units that decode, in parallel, images of regions in the coded picture that are each associated with a different one of the plurality of decoding units, by repeating decoding of a decoding target block by referencing information on an already decoded block in a neighborhood of the decoding target block as neighborhood information; a transfer unit that transfers, for each of the plurality of decoding units, neighborhood information that is to be referenced by the decoding unit and is generated by an other one of the plurality of decoding units, from the other decoding unit to the decoding unit as transfer target neighborhood information; and a detection unit that detects, for each of the plurality of decoding units, whether or not the transfer target neighborhood information that is to be referenced when decoding a decoding target block positioned at an edge of a region associated with the decoding unit has been transferred to the decoding unit, wherein each of the plurality of decoding units decodes the decoding target block positioned at the edge of the region associated with the decoding unit, when the detection unit detects that the transfer target neighborhood information has been transferred to the decoding unit, and a boundary line between the regions is orthogonal to a decoding direction corresponding to an order in which blocks adjacent to each other are sequentially decoded. For example, the decoding direction is a horizontal direction, and one of the plurality of decoding units decodes an image of one of two regions that are arranged in the horizontal direction in the coded picture, and an other one of the plurality of decoding units decodes an image of an other one of the two regions.

According to this, the boundary line between the regions is orthogonal to the decoding direction. This being so, in parallel decoding of the images of these regions, there is no need to generate and transfer target neighborhood information each time a block is decoded in a process of sequentially decoding all blocks in the coded picture, and transfer target neighborhood information is generated and transferred only when a block including a part of the boundary line is decoded. That is, each of the decoding units does not need to set all neighborhood information generated by decoding every block in the region associated with the decoding unit as transfer target neighborhood information, and only needs to set neighborhood information generated by decoding a block including a part of the boundary line in the region as transfer target neighborhood information. Thus, there is no need to frequently transfer neighborhood information as is conventionally done, so that a lower transfer frequency can be attained. As a result, even in a coding system such as H.264 that requires neighborhood information for macroblock decoding, overhead of parallel processing can be suppressed to improve parallelization efficiency, while resolving adjacent macroblock dependencies. In addition, conventionally, decoding units as many as macroblock lines are needed and memories as many as the decoding units are needed to store neighborhood information generated by the corresponding decoding units, which requires a large memory size. According to the present invention, however, the number of decoding units can be reduced, and so the memory size used in the whole apparatus can be reduced. This contributes to a reduction in circuit cost, higher performance, and lower cost.

Note that the present invention can be realized not only as such an image decoding apparatus, but also as an image coding apparatus, methods of processing operations in these apparatuses, programs for causing these apparatuses to perform the processing operations, and storage media on which the programs are stored.

Effects of the Invention

The image decoding apparatus and the image coding apparatus according to the present invention can achieve higher performance and lower cost by efficiently operating a plurality of decoding units or a plurality of coding units in parallel while solving dependencies on neighboring macroblock information with a small amount of information transferred, in a coding system that exploits correlation with neighboring macroblocks to enhance compression efficiency.

(Information about Technical Background to this Application)

The disclosure of Japanese Patent Application No. 2008-135133 filed on May 23, 2008 including specification, drawings, and claims is incorporated herein by reference in its entirety.

DETAILED DESCRIPTION OF THE INVENTION

The following describes embodiments of the present invention with reference to drawings.

First Embodiment

Figure 1:
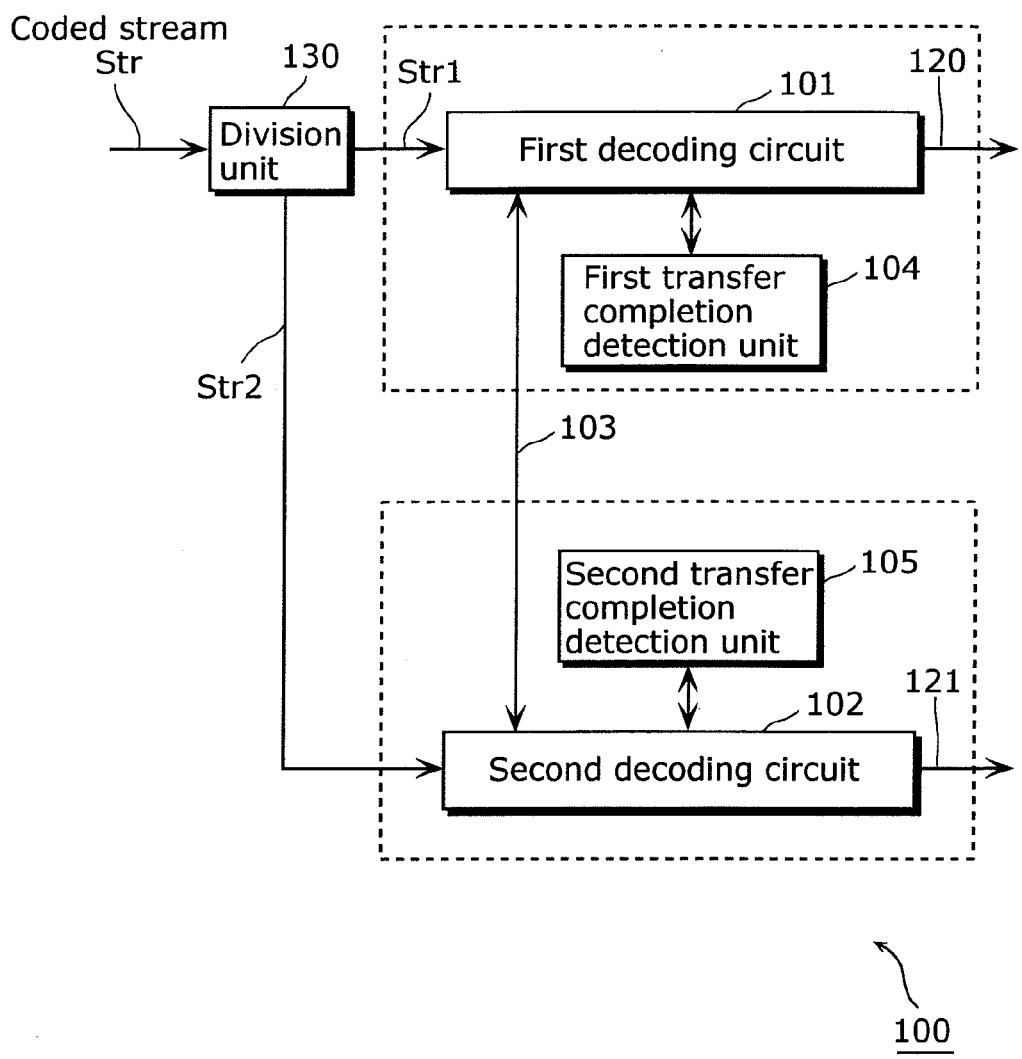
FIG. 1 is a block diagram showing a structure of a moving image decoding apparatus in a first embodiment of the present invention.

FIG. 1 is a block diagram showing a structure of an image decoding apparatus in a first embodiment of the present invention.

An image decoding apparatus 100 in this embodiment includes: a division unit 130 that divides a coded stream Str obtained by coding data showing a moving image according to H.264, and outputs divided coded streams Str1 and Str2; a first decoding circuit 101 that decodes the divided coded stream Str1; a second decoding circuit 102 that decodes the other divided coded stream Str2 in parallel with the decoding process by the first decoding circuit 101; an information transfer bus (data bus) 103 for transferring information between the first decoding circuit 101 and the second decoding circuit 102; and a first transfer completion detection unit 104 and a second transfer completion detection unit 105 that detect completion of information transfer performed between the first decoding circuit 101 and the second decoding circuit 102.

Note that the first decoding circuit 101 and the first transfer completion detection unit 104 may be constructed as one integrated circuit such as LSI (Large Scale Integration), as shown by a dotted box in FIG. 1. Likewise, the second decoding circuit 102 and the second transfer completion detection unit 105 may be constructed as one integrated circuit such as LSI. In this embodiment, each of the first decoding circuit 101 and the second decoding circuit 102 includes a transfer unit that transfers left neighborhood information or right neighborhood information (transfer target neighborhood information) described later, to the other decoding circuit via the information transfer bus 103.

The division unit 130 divides the coded stream Str so that a left part (left divided coded picture) of each coded picture in the coded stream Str is included in the divided coded stream Str1 and a right part (right divided coded picture) which remains is included in the divided coded stream Str2. Note that the division unit 130 divides the coded stream Str on the basis of macroblock (MB) addresses of macroblocks included in each coded picture.

The first decoding circuit 101 obtains the divided coded stream Str1 from the division unit 130 and decodes the divided coded stream Str1. In detail, the first decoding circuit 101 sequentially decodes left divided coded pictures included in the divided coded stream Str1. When doing so, the first decoding circuit 101 decodes each left divided coded picture per macroblock line, downward from a top macroblock line in the left divided coded picture. Note that the macroblock line referred to here is a group composed of a plurality of macroblocks aligned in a horizontal direction in the left divided coded picture. When decoding the macroblock line, the first decoding circuit 101 sequentially decodes macroblocks rightward from a leftmost macroblock, that is, in the horizontal direction. The first decoding circuit 101 then outputs decoded image data 120 generated by the aforementioned decoding.

Furthermore, having decoded a rightmost macroblock positioned at a right edge in the left divided coded picture, the first decoding circuit 101 transfers left neighborhood information generated by the decoding to the second decoding circuit 102 via the information transfer bus 103 so that adjacent macroblock dependencies are satisfied in the decoding process by the second decoding circuit 102.

Note that an adjacent macroblock is any of a left adjacent macroblock that is adjacent left to a decoding target macroblock, an above left adjacent macroblock that is adjacent above left to the decoding target macroblock, an above adjacent macroblock that is adjacent above to the decoding target macroblock, and an above right adjacent macroblock that is adjacent above right to the decoding target macroblock. Adjacent macroblock dependencies denote such relationships that, when an adjacent macroblock is present in the coded picture, the decoding (motion vector prediction, intra-picture prediction, or deblocking filter processing) of the decoding target macroblock is performed by referencing neighborhood information showing a decoding result of the adjacent macroblock. Note that the four adjacent macroblocks mentioned earlier represent a maximum range of neighborhood information that can be referenced, and all neighborhood information may not necessarily be referenced. Moreover, neighborhood information is a decoded motion vector and pixel value of an adjacent macroblock in the case where the decoding target macroblock is inter-picture prediction coded, and the pixel value of the adjacent macroblock in the case where the decoding target macroblock is intra-picture prediction coded. Left neighborhood information is neighborhood information on a left adjacent macroblock in the left divided coded picture in the case where the decoding target macroblock is a top leftmost macroblock in the right divided coded picture, and neighborhood information on a left adjacent macroblock and an above left adjacent macroblock in the left divided coded picture in the case where the decoding target macroblock is a leftmost macroblock in the right divided coded picture except the top leftmost macroblock.

The second decoding circuit 102 obtains the divided coded stream Str2 from the division unit 130 and decodes the divided coded stream Str2. In detail, the second decoding circuit 102 sequentially decodes right divided coded pictures included in the divided coded stream Str2. When doing so, the second decoding circuit 102 decodes each right divided coded picture per macroblock line, downward from a top macroblock line in the right divided coded picture. Note that the macroblock line referred to here is a group composed of a plurality of macroblocks aligned in the horizontal direction in the right divided coded picture. When decoding the macroblock line, the second decoding circuit 102 sequentially decodes macroblocks rightward from a leftmost macroblock, that is, in the horizontal direction. The second decoding circuit 102 then outputs decoded image data 121 generated by the aforementioned decoding.

Furthermore, having decoded a leftmost macroblock positioned at a left edge in the right divided coded picture, the second decoding circuit 102 transfers right neighborhood information generated by the decoding to the first decoding circuit 101 via the information transfer bus 103 so that adjacent macroblock dependencies are satisfied in the decoding process by the first decoding circuit 101. Note that right neighborhood information is neighborhood information on an above right adjacent macroblock in the right divided coded picture in the case where the decoding target macroblock is a rightmost macroblock in the left divided coded picture except a top rightmost macroblock.

The first transfer completion detection unit 104, upon detecting that right neighborhood information necessary for the decoding process by the first decoding circuit 101 has been transferred from the second decoding circuit 102 to the first decoding circuit 101, notifies the first decoding circuit 101 of the transfer. When the first decoding circuit 101 decodes a rightmost macroblock (rightmost decoding target block) in the left divided coded picture, in the case where a macroblock (above right adjacent macroblock) adjacent above right to the rightmost decoding target block is present in the right divided coded picture, right neighborhood information on the above right adjacent macroblock is needed. Accordingly, upon detecting the transfer of the right neighborhood information on the above right adjacent macroblock, the first transfer completion detection unit 104 notifies the first decoding circuit 101 of the transfer, thereby causing the first decoding circuit 101 to start decoding the rightmost decoding target block. In other words, when decoding the rightmost decoding target block, the first decoding circuit 101 waits without performing the decoding unless notified from the first transfer completion detection unit 104, and starts the decoding upon receiving the notification.

The second transfer completion detection unit 105, upon detecting that left neighborhood information necessary for the decoding process by the second decoding circuit 102 has been transferred from the first decoding circuit 101 to the second decoding circuit 102, notifies the second decoding circuit 102 of the transfer. When the second decoding circuit 102 decodes a leftmost macroblock (leftmost decoding target block) in the right divided coded picture, in the case where a macroblock (above left adjacent macroblock) adjacent above left to the leftmost decoding target block and a macroblock (left adjacent macroblock) adjacent left to the leftmost decoding target block are present in the left divided coded picture, left neighborhood information on the above left adjacent macroblock and the left adjacent macroblock is needed. On the other hand, in the case where the above left adjacent macroblock is not present and only the left adjacent macroblock is present in the left divided coded picture, left neighborhood information on the left adjacent macroblock is needed. Accordingly, upon detecting the transfer of the left neighborhood information on the above left adjacent macroblock and the left adjacent macroblock or the transfer of only the left neighborhood information on the left adjacent macroblock, the second transfer completion detection unit 105 notifies the second decoding circuit 102 of the transfer, thereby causing the second decoding circuit 102 to start decoding the leftmost decoding target block. In other words, when decoding the leftmost decoding target block, the second decoding circuit 102 waits without performing the decoding unless notified from the second transfer completion detection unit 105, and starts the decoding upon receiving the notification.

In such an image decoding apparatus 100, having decoded a macroblock, the first decoding circuit 101 stores information obtained by the decoding in a memory included in the first decoding circuit 101, as neighborhood information necessary for decoding another macroblock. Upon decoding a macroblock, when any of four adjacent macroblocks (left adjacent macroblock, above left adjacent macroblock, above adjacent macroblock, and above right adjacent macroblock) which are adjacent to the macroblock is present in the coded picture, the first decoding circuit 101 decodes the decoding target macroblock by referencing neighborhood information obtained by decoding the adjacent macroblock and stored in the memory. However, in the case where the adjacent macroblock in the coded picture is not decoded by the first decoding circuit 101 but decoded by the second decoding circuit 102, the neighborhood information on the adjacent macroblock is not stored in the memory in the first decoding circuit 101. In this case, the first decoding circuit 101 obtains the neighborhood information on the adjacent macroblock transferred from the second decoding circuit 102 as right neighborhood information, and stores the right neighborhood information in the memory. When the first decoding circuit 101 has neighborhood information on all adjacent macroblocks present in the coded picture, the first decoding circuit 101 decodes the decoding target macroblock by referencing all neighborhood information including the right neighborhood information.

Likewise, having decoded a macroblock, the second decoding circuit 102 stores information obtained by the decoding in a memory included in the second decoding circuit 102, as neighborhood information necessary for decoding another macroblock. Upon decoding a macroblock, when any of four adjacent macroblocks which are adjacent to the macroblock is present in the coded picture, the second decoding circuit 102 decodes the decoding target macroblock by referencing neighborhood information obtained by decoding the adjacent macroblock and stored in the memory. However, in the case where the adjacent macroblock in the coded picture is not decoded by the second decoding circuit 102 but decoded by the first decoding circuit 101, the neighborhood information on the adjacent macroblock is not stored in the memory in the second decoding circuit 102. In this case, the second decoding circuit 102 obtains the neighborhood information on the adjacent macroblock transferred from the first decoding circuit 101 as left neighborhood information, and stores the left neighborhood information in the memory. When the second decoding circuit 102 has neighborhood information on all adjacent macroblocks present in the coded picture, the second decoding circuit 102 decodes the decoding target macroblock by referencing all neighborhood information including the left neighborhood information.

Thus, in the image decoding apparatus 100 in this embodiment, by transferring the left neighborhood information and the right neighborhood information between the first decoding circuit 101 and the second decoding circuit 102, it is possible to realize macroblock decoding in conformity with H.264 that uses decoding results of adjacent macroblocks.

Figure 2:
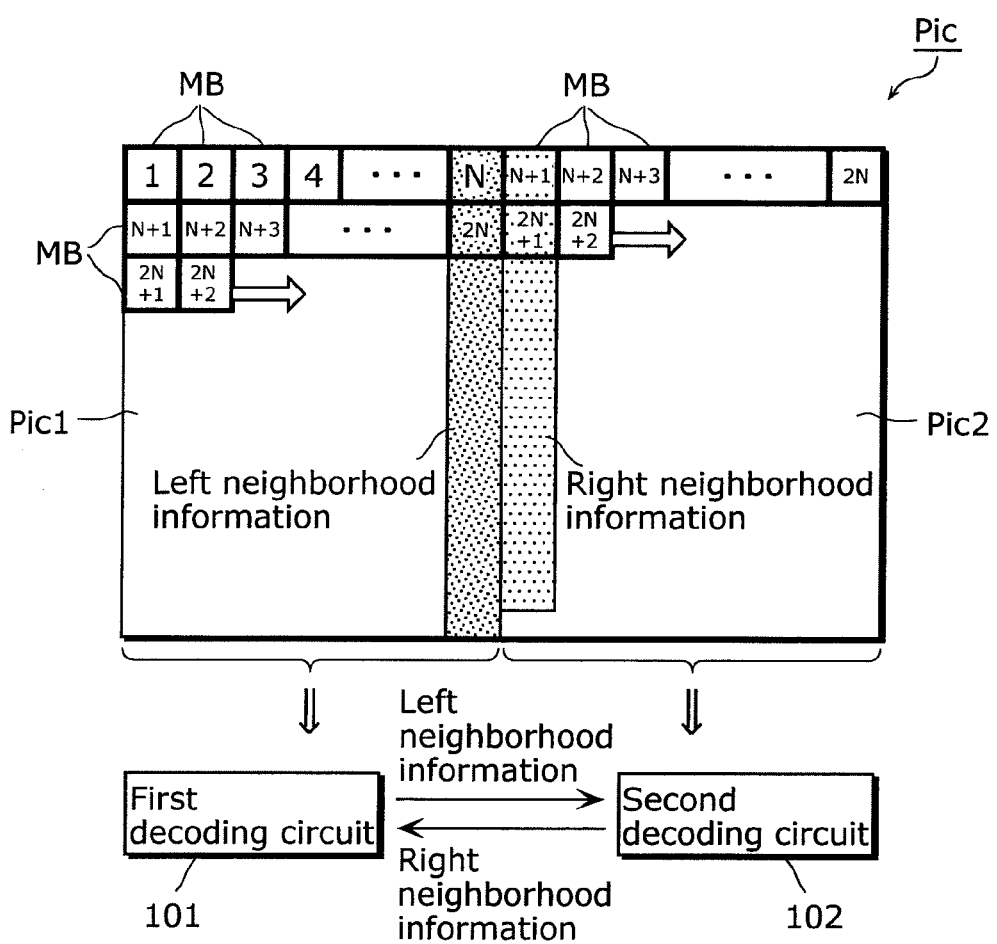
FIG. 2 is an explanatory diagram for explaining an operation of the image decoding apparatus in the first embodiment of the present invention.

FIG. 2 is an explanatory diagram for explaining an operation of the image decoding apparatus 100 in this embodiment.

The division unit 130 divides a coded picture Pic by two into left and right, to generate a left divided coded picture Pic1 and a right divided coded picture Pic2.

Here, the coded picture Pic is composed of a plurality of macroblocks MB arranged in the horizontal and vertical directions. When decoding a macroblock line in the coded picture Pic, the first decoding circuit 101 and the second decoding circuit 102 sequentially decode a plurality of macroblocks in the horizontal direction. Note that the numbers from 1 to 2N+2 (N is an integer equal to or more than 2) shown in the macroblocks MB in FIG. 2 roughly indicate an order in which the macroblocks are decoded. This being so, the division unit 130 divides the coded picture Pic in a direction orthogonal to the direction in which the macroblocks are decoded by the first decoding circuit 101 and the second decoding circuit 102. That is, the division unit 130 divides the coded picture Pic so that a boundary line between the left divided coded picture Pic1 and the right divided coded picture Pic2 is orthogonal to the aforementioned decoding direction.

Note that the division unit 130 in this embodiment divides the coded picture Pic so that the left divided coded picture Pic1 and the right divided coded picture Pic2 have the same size. As a result, the number of macroblocks included in each macroblock line is N in both the left divided coded picture Pic1 and the right divided coded picture Pic2.

The first decoding circuit 101 decodes the left divided coded picture Pic1, and the second decoding circuit 102 decodes the right divided coded picture Pic2.

In detail, first, the first decoding circuit 101 sequentially decodes macroblocks MB from a top leftmost macroblock MB (1st) to a top rightmost macroblock MB (Nth) in a top macroblock line in the left divided coded picture Pic1. Since the Nth macroblock MB is a rightmost macroblock in the left divided coded picture Pic1, the first decoding circuit 101 transfers left neighborhood information obtained by decoding the Nth macroblock MB to the second decoding circuit 102.

Next, the first decoding circuit 101 sequentially decodes macroblocks MB from a (N+1)th macroblock MB to a 2Nth macroblock MB in a macroblock line second from the top in the left divided coded picture Pic1. At this time, the second decoding circuit 102 sequentially decodes macroblocks MB from a top leftmost macroblock MB ((N+1)th) to a top rightmost macroblock MB (2Nth) in a top macroblock line in the right divided coded picture Pic2. That is, the first decoding circuit 101 and the second decoding circuit 102 execute the decoding of the macroblock line second from the top in the left divided coded picture Pic1 and the decoding of the top macroblock line in the right divided coded picture Pic2, in parallel.

Here, when the second decoding circuit 102 decodes the (N+1)th macroblock MB in the right divided coded picture Pic2, this macroblock MB is a leftmost decoding target block, so that left neighborhood information for decoding the leftmost decoding target block MB is needed. In the coded picture Pic, the Nth macroblock MB in the left divided coded picture Pic1 is adjacent to the leftmost decoding target block MB ((N+1)th), as a left adjacent macroblock. This being so, to decode the aforementioned (N+1)th leftmost decoding target block, the second decoding circuit 102 needs left neighborhood information showing a decoding result of the left adjacent macroblock. Accordingly, the second decoding circuit 102 waits without decoding the leftmost decoding target block until notified of the transfer of the left neighborhood information on the left adjacent macroblock from the first decoding circuit 101, and performs the decoding after receiving the notification.

Meanwhile, when the first decoding circuit 101 decodes the 2Nth macroblock MB in the left divided coded picture Pic1, this macroblock MB is a rightmost decoding target block, so that right neighborhood information for decoding the rightmost decoding target block is needed. In the coded picture Pic, the (N+1)th macroblock MB in the right divided coded picture Pic2 is adjacent to this rightmost decoding target block MB (2Nth), as an above right adjacent macroblock. This being so, to decode the aforementioned 2Nth rightmost decoding target block, the first decoding circuit 101 needs right neighborhood information showing a decoding result of the above right adjacent macroblock. Accordingly, the first decoding circuit 101 waits without decoding the rightmost decoding target block until notified of the transfer of the right neighborhood information on the above right adjacent macroblock from the second decoding circuit 102, and performs the decoding after receiving the notification.

Next, the first decoding circuit 101 sequentially decodes macroblocks MB from a (2N+1)th macroblock MB to a 3Nth macroblock MB in a macroblock line third from the top in the left divided coded picture Pic1. At this time, the second decoding circuit 102 sequentially decodes macroblocks MB from a (2N+1)th macroblock MB to a 3Nth macroblock MB in a macroblock line second from the top in the right divided coded picture Pic2. Thus, the first decoding circuit 101 and the second decoding circuit 102 execute the decoding of the macroblock line third from the top in the left divided coded picture Pic1 and the decoding of the macroblock line second from the top in the right divided coded picture Pic2, in parallel.

Here, when the second decoding circuit 102 decodes the (2N+1)th macroblock MB in the right divided coded picture Pic2, this macroblock MB is a leftmost decoding target block, so that left neighborhood information for decoding the leftmost decoding target block MB is needed. In the coded picture Pic, the Nth macroblock MB in the left divided coded picture Pic1 is adjacent to the leftmost decoding target block MB ((2N+1)th), as an above left adjacent macroblock. In addition, the 2Nth macroblock MB in the left divided coded picture Pic1 is adjacent to the leftmost decoding target block MB ((2N+1)th), as a left adjacent macroblock. This being so, to decode the aforementioned (2N+1)th leftmost decoding target block, the second decoding circuit 102 needs left neighborhood information showing decoding results of the left adjacent macroblock and the above left adjacent macroblock. Accordingly, the second decoding circuit 102 waits without decoding the leftmost decoding target block until notified of the transfer of the left neighborhood information on the left adjacent macroblock and the above left adjacent macroblock from the first decoding circuit 101, and performs the decoding after receiving the notification.

Figure 3:
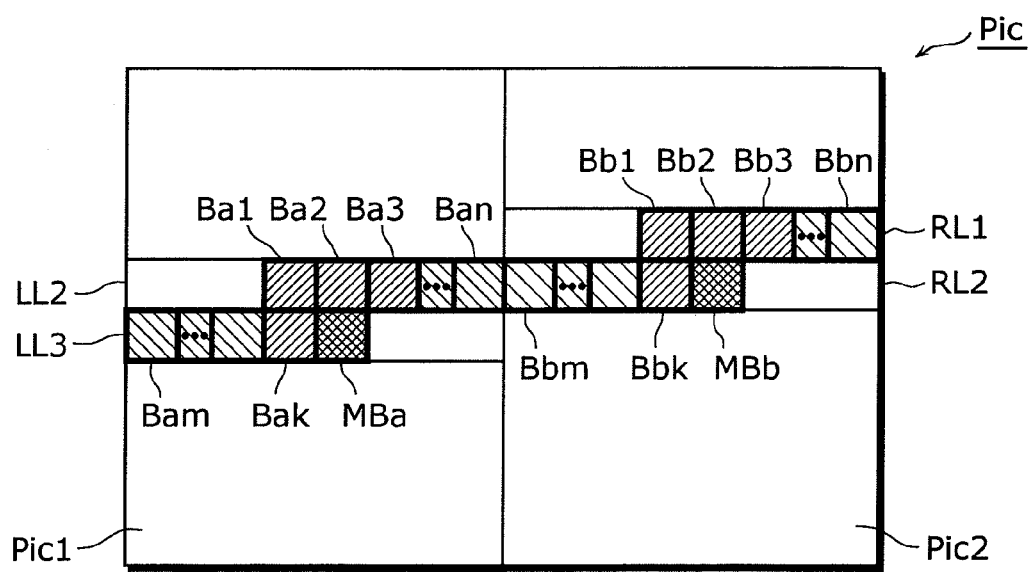
FIG. 3 is an explanatory diagram for explaining adjacent macroblocks and neighborhood information in the first embodiment of the present invention.

FIG. 3 is an explanatory diagram for explaining adjacent macroblocks and neighborhood information.

The first decoding circuit 101 decodes a macroblock MBa in the left divided coded picture Pic1, as an example. At this time, the first decoding circuit 101 has neighborhood information showing a decoding result of each of macroblocks Bam to Bak included in a macroblock line LL3 having the decoding target macroblock MBa and neighborhood information showing a decoding result of each of macroblocks Ba1 to Ban included in a macroblock line LL2 immediately above the macroblock line LL3, stored in the memory. Which is to say, in the case where the first decoding circuit 101 has already decoded each of the macroblocks from the above left adjacent macroblock to the rightmost macroblock included in the macroblock line immediately above the decoding target macroblock and each of the macroblocks from the leftmost macroblock to the left adjacent macroblock included in the macroblock line having the decoding target macroblock, the first decoding circuit 101 has at least the decoding results of these macroblocks stored in the memory as neighborhood information. Hence, the memory included in the first decoding circuit 101 has a capacity for storing at least an amount of neighborhood information equivalent to one macroblock line and one macroblock generated in the first decoding circuit 101, and an amount of neighborhood information equivalent to one macroblock received from the second decoding circuit 102.

This being the case, the first decoding circuit 101 decodes the macroblock MBa by referencing the neighborhood information on the left adjacent macroblock Bak, the above left adjacent macroblock Ba1, the above adjacent macroblock Ba2, and the above right adjacent macroblock Ba3 stored in the memory. That is, in the case where each of the left adjacent macroblock, the above left adjacent macroblock, the above adjacent macroblock, and the above right adjacent macroblock is present in the left divided coded picture Pic1 as an adjacent macroblock, the first decoding circuit 101 decodes the decoding target macroblock by referencing the neighborhood information on these adjacent macroblocks.

In the same manner, the second decoding circuit 102 decodes a macroblock MBb in the right divided coded picture Pic2, as an example. At this time, the second decoding circuit 102 has neighborhood information showing a decoding result of each of macroblocks Bbm to Bbk included in a macroblock line RL2 having the decoding target macroblock MBb and neighborhood information showing a decoding result of each of macroblocks Bb1 to Bbn included in a macroblock line RL1 immediately above the macroblock line RL2, stored in the memory. Which is to say, in the case where the second decoding circuit 102 has already decoded each of the macroblocks from the above left adjacent macroblock to the rightmost macroblock included in the macroblock line immediately above the decoding target macroblock and each of the macroblocks from the leftmost macroblock to the left adjacent macroblock included in the macroblock line having the decoding target macroblock, the second decoding circuit 102 has at least the decoding results of these macroblocks stored in the memory as neighborhood information. Hence, the memory included in the second decoding circuit 102 has a capacity for storing at least an amount of neighborhood information equivalent to one macroblock line and one macroblock generated in the second decoding circuit 102, and an amount of neighborhood information equivalent to one macroblock received from the first decoding circuit 101.

This being the case, the second decoding circuit 102 decodes the macroblock MBb by referencing the neighborhood information on the left adjacent macroblock Bbk, the above left adjacent macroblock Bb1, the above adjacent macroblock Bb1, and the above right adjacent macroblock Bb3 stored in the memory. That is, in the case where each of the left adjacent macroblock, the above left adjacent macroblock, the above adjacent macroblock, and the above right adjacent macroblock is present in the right divided coded picture Pic2 as an adjacent macroblock, the second decoding circuit 102 decodes the decoding target macroblock by referencing the neighborhood information on these adjacent macroblocks.

Figure 4A:
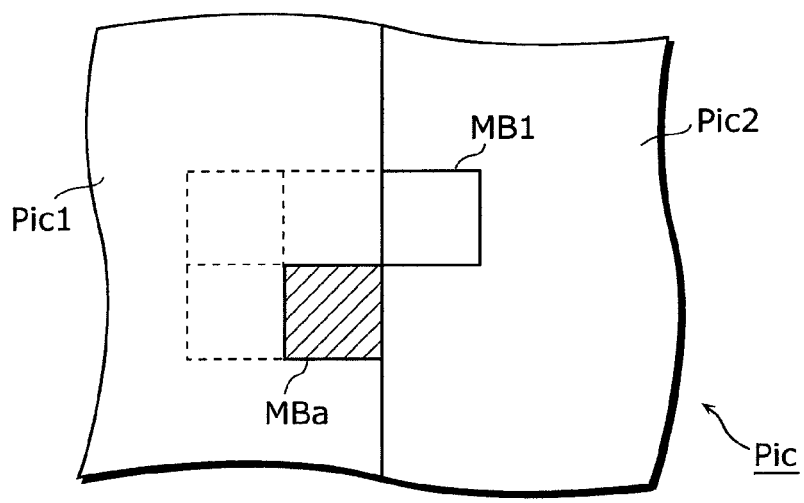
FIG. 4A is a diagram showing adjacent macroblocks in the case where a decoding target macroblock is a rightmost decoding target block in the first embodiment of the present invention.

FIG. 4A is a diagram showing adjacent macroblocks in the case where the decoding target macroblock is a rightmost decoding target block.

For example, when the decoding target macroblock MBa is a rightmost decoding target block in the left divided coded picture Pic1, an above right adjacent macroblock MB1 of the decoding target macroblock MBa may be present in the right divided coded picture Pic2. In such a case, right neighborhood information on the above right adjacent macroblock MB1 included in the right divided coded picture Pic2 is stored not in the memory in the first decoding circuit 101 but in the memory in the second decoding circuit 102. Accordingly, the first decoding circuit 101 obtains the right neighborhood information on the above right adjacent macroblock MB1 included in the right divided coded picture Pic2 from the second decoding circuit 102, and decodes the decoding target macroblock MBa by referencing this right neighborhood information.

Note that, when the decoding target macroblock MBa is the top rightmost macroblock in the left divided coded picture Pic1, the above right adjacent macroblock is not present in the right divided coded picture Pic2. In this case, the first decoding circuit 101 decodes the decoding target macroblock without referencing the right neighborhood information.

Figure 4B:
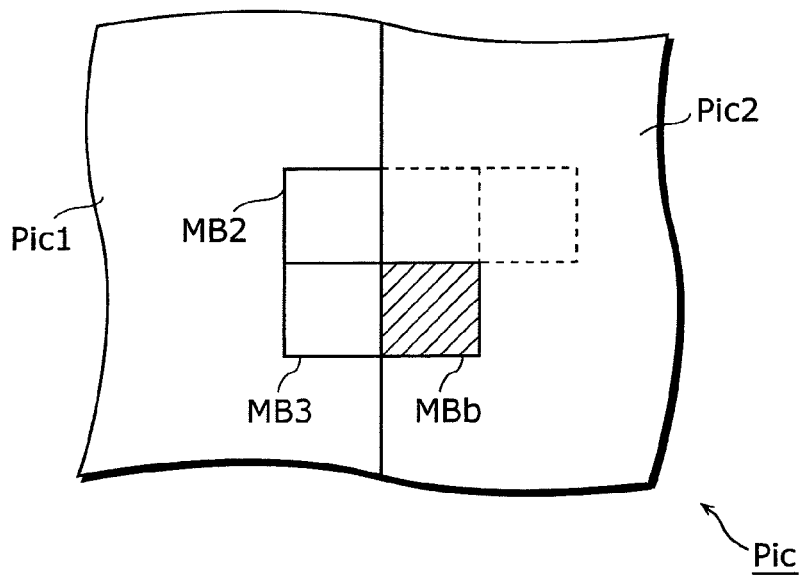
FIG. 4B is a diagram showing adjacent macroblocks in the case where a decoding target macroblock is a leftmost decoding target block in the first embodiment of the present invention.

FIG. 4B is a diagram showing adjacent macroblocks in the case where the decoding target macroblock is a leftmost decoding target block.

For example, when the decoding target macroblock MBb is a leftmost decoding target block in the right divided coded picture Pic2, an above left adjacent macroblock MB2 and a left adjacent macroblock MB3 of the decoding target macroblock MBb may be present in the left divided coded picture Pic1. In such a case, left neighborhood information on each of the above left adjacent macroblock MB2 and the left adjacent macroblock MB3 included in the left divided coded picture Pic1 is stored not in the memory in the second decoding circuit 102 but in the memory in the first decoding circuit 101. Accordingly, the second decoding circuit 102 obtains the left neighborhood information on each of the above left adjacent macroblock MB2 and the left adjacent macroblock MB3 included in the left divided coded picture Pic1 from the first decoding circuit 101, and decodes the decoding target macroblock MBb by referencing these left neighborhood information.

Note that, when the decoding target macroblock MBb is the top leftmost macroblock in the right divided coded picture Pic2, the above left adjacent macroblock is not present in the left divided coded picture Pic1. In this case, the second decoding circuit 102 decodes the decoding target macroblock by referencing the left neighborhood information on the left adjacent macroblock, without referencing the left neighborhood information on the above left adjacent macroblock.

Figure 5:
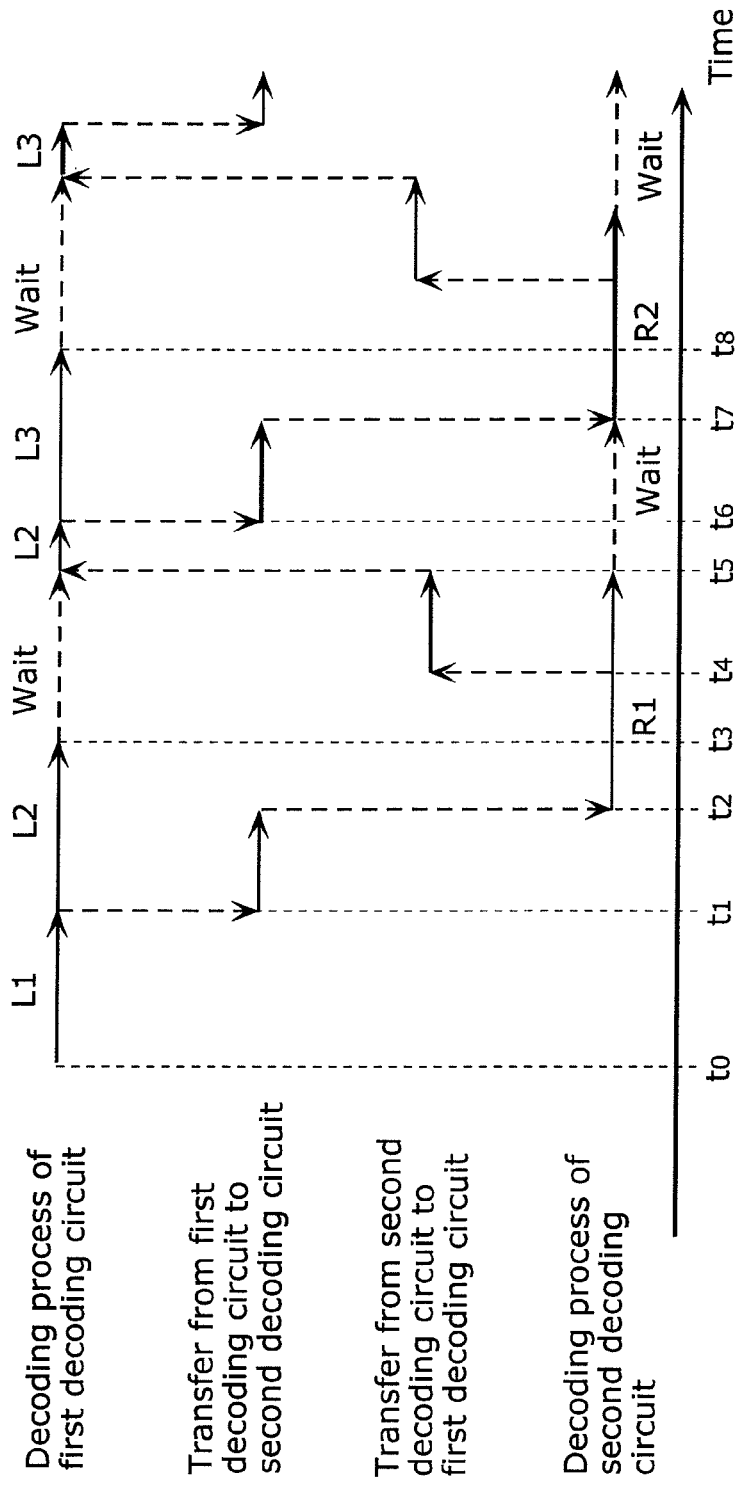
FIG. 5 is a diagram showing an example of processing timings of a first decoding circuit and a second decoding circuit in the first embodiment of the present invention.

FIG. 5 is a diagram showing an example of processing timings of the first decoding circuit 101 and the second decoding circuit 102. Note that the timings shown in FIG. 5 are merely an example for illustrating processing operations of the first decoding circuit 101 and the second decoding circuit 102 in an easily understood manner.

First, the first decoding circuit 101 starts decoding a top macroblock line L1 in the left divided coded picture Pic1, at time t0. When the decoding of the macroblock line L1 ends at time t1, the first decoding circuit 101 transfers left neighborhood information showing a decoding result of a rightmost decoding target block to the second decoding circuit 102. Further, the first decoding circuit 101 starts decoding a macroblock line L2 second from the top in the left divided coded picture Pic1. Meanwhile, upon obtaining the left neighborhood information transferred from the first decoding circuit 101 at time t2, the second decoding circuit 102 starts decoding a top macroblock line R1 in the right divided coded picture Pic2 by referencing the left neighborhood information.

Here, after decoding a macroblock second from the right in the macroblock line L2, the first decoding circuit 101 stops the decoding process and enters a wait state from time t3, since there is no right neighborhood information necessary for decoding the next decoding target macroblock (rightmost decoding target block). On the other hand, having decoded a leftmost decoding target block in the macroblock line R1 at time t4, the second decoding circuit 102 transfers right neighborhood information showing a result of the decoding to the first decoding circuit 101.

When the first decoding circuit 101 obtains the right neighborhood information from the second decoding circuit 102 and is notified by the first transfer completion detection unit 104 of the transfer of the right neighborhood information to the first decoding circuit 101 at time t5, the first decoding circuit 101 clears the wait state and decodes the rightmost decoding target block in the macroblock line L2 by referencing the right neighborhood information. Meanwhile, the second decoding circuit 102 completes the decoding of the macroblock line R1 at time t5 and tries to start decoding the next macroblock line R2. However, since there is no left neighborhood information necessary for decoding a leftmost decoding target block in the macroblock line R2, the second decoding circuit 102 stops the decoding process and enters a wait state from time t5.

Upon completing the decoding of the rightmost decoding target block in the macroblock line L2 at time t6, the first decoding circuit 101 transfers left neighborhood information showing a result of the decoding to the second decoding circuit 102. Further, the first decoding circuit 101 starts decoding the next macroblock line L3. Meanwhile, when the second decoding circuit 102 obtains the left neighborhood information from the first decoding circuit 101 and is notified by the second transfer completion detection unit 105 of the transfer of the left neighborhood information to the second decoding circuit 102 at time t7, the second decoding circuit 102 clears the wait state and starts decoding the macroblock line R2 by referencing the left neighborhood information, thereby decoding the leftmost decoding target block.

Subsequently, after decoding a macroblock second from the right in the macroblock line L3, the first decoding circuit 101 stops the decoding process and enters a wait state from time t8, since there is no right neighborhood information necessary for decoding the next decoding target macroblock (rightmost decoding target block).

Figure 6:
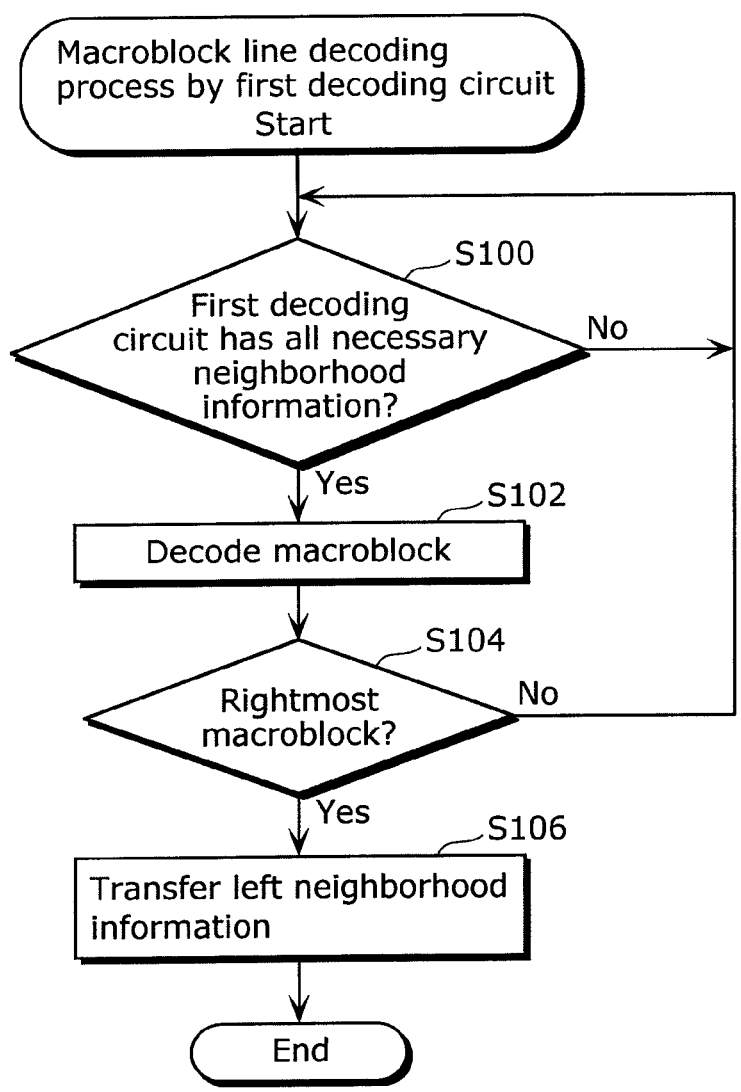
FIG. 6 is a flowchart showing an operation when the first decoding circuit decodes a macroblock line in the first embodiment of the present invention.

FIG. 6 is a flowchart showing an operation when the first decoding circuit 101 decodes a macroblock line.

First, the first decoding circuit 101 determines whether or not the first decoding circuit 101 has all neighborhood information necessary for decoding a decoding target macroblock (Step S100). For example, in the case where the decoding target macroblock is a rightmost decoding target block, the first decoding circuit 101 determines whether or not the transfer of right neighborhood information is notified by the first transfer completion detection unit 104. When the first decoding circuit 101 determines that it has all necessary neighborhood information (Step S100: Yes), the first decoding circuit 101 decodes the decoding target macroblock by referencing the neighborhood information (Step S102). When the first decoding circuit 101 determines that it does not have all necessary neighborhood information (Step S100: No), on the other hand, the first decoding circuit 101 waits because the decoding target macroblock cannot be decoded.

After decoding the decoding target macroblock in Step S102, the first decoding circuit 101 determines whether or not the decoded macroblock is a rightmost macroblock in the macroblock line (Step S104). When the first decoding circuit 101 determines that the decoded macroblock is the rightmost macroblock (Step S104: Yes), the first decoding circuit 101 transfers left neighborhood information showing a result of decoding the rightmost macroblock, to the second decoding circuit 102 (Step S106). When the first decoding circuit 101 determines that the decoded macroblock is not the rightmost macroblock (Step S104: No), on the other hand, the first decoding circuit 101 sets a macroblock adjacent right to the decoded macroblock as the next decoding target macroblock, and repeats the process from Step S100. The macroblock line is decoded in this way. By repeating such macroblock line decoding, the left divided coded picture Pic1 of the coded picture Pic is decoded.

Figure 7:
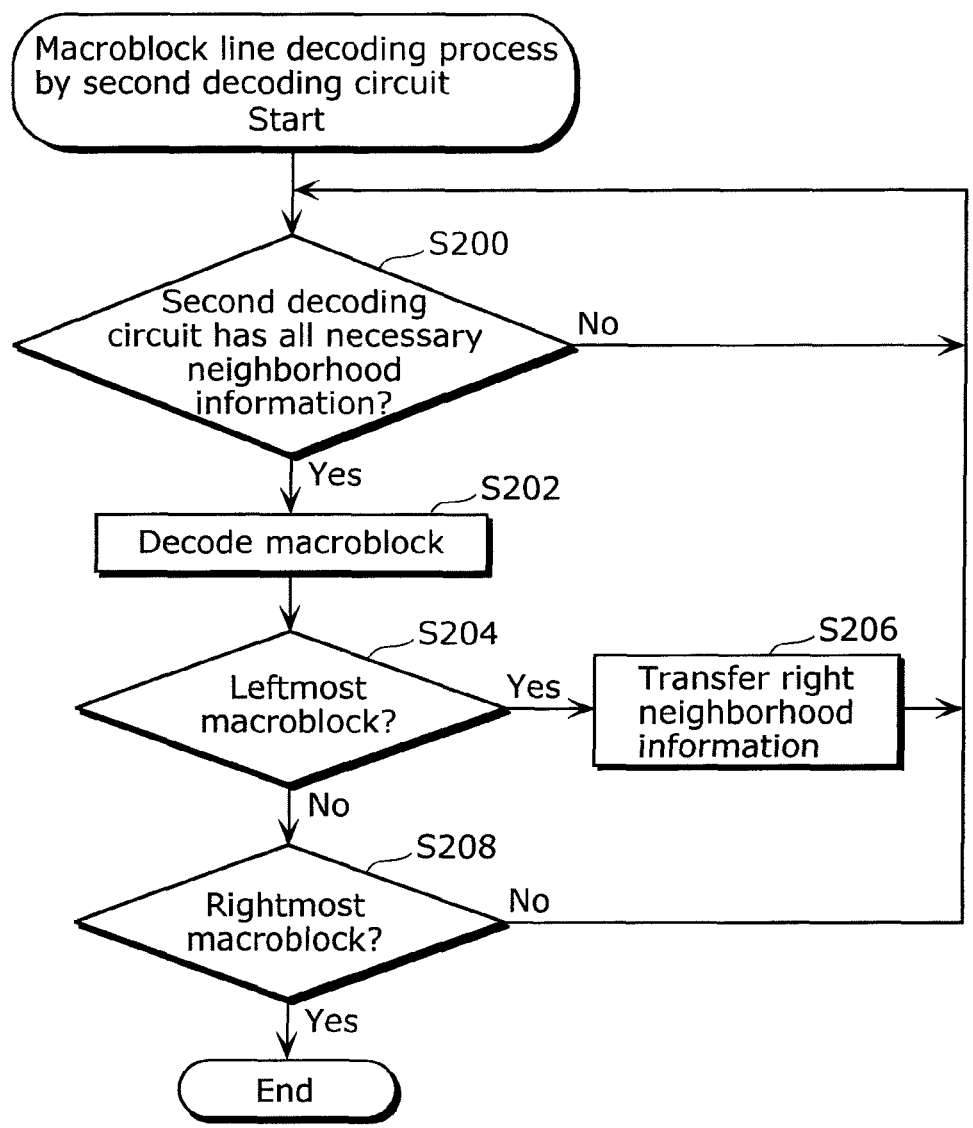
FIG. 7 is a flowchart showing an operation when the second decoding circuit decodes a macroblock line in the first embodiment of the present invention.

FIG. 7 is a flowchart showing an operation when the second decoding circuit 102 decodes a macroblock line.

First, the second decoding circuit 102 determines whether or not the second decoding circuit 102 has all neighborhood information necessary for decoding a decoding target macroblock (Step S200). For example, in the case where the decoding target macroblock is a leftmost decoding target block, the second decoding circuit 102 determines whether or not the transfer of left neighborhood information is notified by the second transfer completion detection unit 105. When the second decoding circuit 102 determines that it has all necessary neighborhood information (Step S200: Yes), the second decoding circuit 102 decodes the decoding target macroblock by referencing the neighborhood information (Step S202). When the second decoding circuit 102 determines that it does not have all necessary neighborhood information (Step S200: No), on the other hand, the second decoding circuit 102 waits because the decoding target macroblock cannot be decoded.

After decoding the decoding target macroblock in Step S202, the second decoding circuit 102 determines whether or not the decoded macroblock is a leftmost macroblock in the macroblock line (Step S204). When the second decoding circuit 102 determines that the decoded macroblock is the leftmost macroblock (Step S204: Yes), the second decoding circuit 102 transfers right neighborhood information showing a result of decoding the leftmost macroblock, to the first decoding circuit 101 (Step S206). When the second decoding circuit 102 determines that the decoded macroblock is not the leftmost macroblock (Step S204: No), on the other hand, the second decoding circuit 102 further determines whether or not the decoded macroblock is a rightmost macroblock in the macroblock line (Step S208). When the second decoding circuit 102 determines that the decoded macroblock is the rightmost macroblock (Step S208: Yes), the decoding process of the macroblock line is completed. When the second decoding circuit 102 determines that the decoded macroblock is not the rightmost macroblock (Step S208: No), the second decoding circuit 102 sets a macroblock adjacent right to the decoded macroblock as the next decoding target macroblock, and repeats the process from Step S200. The macroblock line is decoded in this way. By repeating such macroblock line decoding, the right divided coded picture Pic2 of the coded picture Pic is decoded.

As described above, in this embodiment, the boundary line between the regions (the left divided coded picture Pic1 and the right divided coded picture Pic2) is orthogonal to the decoding direction. Accordingly, in parallel decoding of images in these regions, there is no need to transfer neighborhood information each time a macroblock is decoded in a process of sequentially decoding all macroblocks in the coded picture Pic, and neighborhood information is transferred as left neighborhood information or right neighborhood information only when a macroblock including a part of the boundary line is decoded. Thus, there is no need to frequently transfer neighborhood information as is conventionally done, so that a lower transfer frequency can be attained. As a result, even in a coding system such as H.264 that requires neighborhood information for macroblock decoding, overhead of parallel processing can be suppressed to improve parallelization efficiency, while resolving adjacent macroblock dependencies. In addition, conventionally, decoding units as many as macroblock lines are needed and memories as many as the decoding units are needed to store neighborhood information generated by the corresponding decoding units, which requires a large memory size. In this embodiment, however, the number of decoding units can be reduced, and so the memory size used in the whole apparatus can be reduced. This contributes to a reduction in circuit cost, higher performance, and lower cost.

First Variation

A first variation in this embodiment is described below. In an image decoding apparatus according to this variation, left neighborhood information and right neighborhood information are passed between the first decoding circuit 101 and the second decoding circuit 102 in a different manner from the image decoding apparatus 100 in the first embodiment described above.

Figure 8:
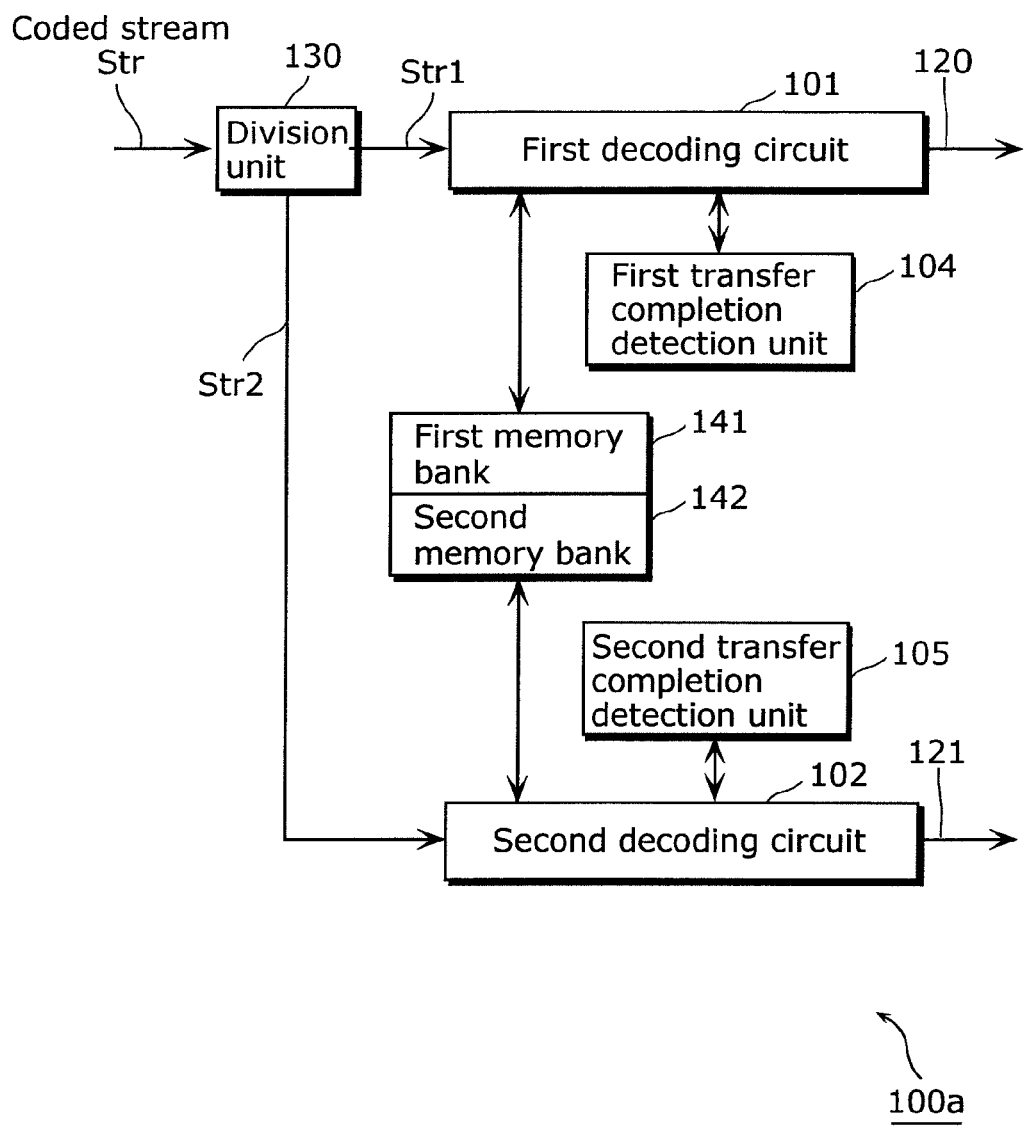
FIG. 8 is a block diagram showing a structure of an image decoding apparatus according to a first variation of the first embodiment of the present invention.

FIG. 8 is a block diagram showing a structure of the image decoding apparatus according to this variation.

An image decoding apparatus 100a according to this variation includes the division unit 130, the first decoding circuit 101, the second decoding circuit 102, the first transfer completion detection unit 104, the second transfer completion detection unit 105, a first memory bank 141, and a second memory bank 142.

Note that, in FIG. 8, components having the same functions and structures as those in the image decoding apparatus 100 in the first embodiment described above are given the same numerals as those in the image decoding apparatus 100, and their detailed description is omitted.

In the image decoding apparatus 100a according to this variation, instead of sending/receiving left neighborhood information and right neighborhood information via the information transfer bus 103, the first decoding circuit 101 and the second decoding circuit 102 pass the left neighborhood information and the right neighborhood information by accessing the first memory bank 141 and the second memory bank 142. In other words, bank switching between the first memory bank 141 and the second memory bank 142 enables the left neighborhood information and the right neighborhood information to be shared by the first decoding circuit 101 and the second decoding circuit 102.

The first memory bank 141 has an area for storing neighborhood information generated by the first decoding circuit 101, and is accessed by the first decoding circuit 101 and the second decoding circuit 102.

The second memory bank 142 has an area for storing neighborhood information generated by the second decoding circuit 102, and is accessed by the first decoding circuit 101 and the second decoding circuit 102.

Each time the first decoding circuit 101 decodes a macroblock in the left divided coded picture Pic1, the first decoding circuit 101 stores neighborhood information generated by the decoding in the first memory bank 141. Moreover, upon decoding a macroblock, in the case where neighborhood information on an adjacent macroblock is stored in the first memory bank 141, the first decoding circuit 101 reads the neighborhood information and decodes the macroblock by referencing the neighborhood information.

Each time the second decoding circuit 102 decodes a macroblock in the right divided coded picture Pic2, the second decoding circuit 102 stores neighborhood information generated by the decoding in the second memory bank 142. Moreover, upon decoding a macroblock, in the case where neighborhood information on an adjacent macroblock is stored in the second memory bank 142, the second decoding circuit 102 reads the neighborhood information and decodes the macroblock by referencing the neighborhood information.

In the case where the decoding target macroblock is a rightmost decoding target block in the left divided coded picture Pic1 except the top rightmost macroblock, neighborhood information on an above right adjacent macroblock necessary for decoding the rightmost decoding target block is not stored in the first memory bank 141. Which is to say, since the above right adjacent macroblock is present in the right divided coded picture Pic2, the above right adjacent macroblock is decoded by the second decoding circuit 102 and the neighborhood information on the above right adjacent macroblock is stored in the second memory bank 142.

Therefore, when decoding the rightmost decoding target block in the left divided coded picture Pic1 except the top rightmost macroblock, the first decoding circuit 101 obtains the neighborhood information on the above right adjacent macroblock stored in the second memory bank 142 as right neighborhood information, and decodes the rightmost decoding target block by referencing the right neighborhood information.

Likewise, in the case where the decoding target macroblock is a leftmost decoding target block in the right divided coded picture Pic2, neighborhood information on a left adjacent macroblock (and an above left adjacent macroblock) necessary for decoding the leftmost decoding target block is not stored in the second memory bank 142. Which is to say, since the left adjacent macroblock (and the above left adjacent macroblock) is present in the left divided coded picture Pic1, the left adjacent macroblock (and the above left adjacent macroblock) is decoded by the first decoding circuit 101 and the neighborhood information on the left adjacent macroblock (and the above left adjacent macroblock) is stored in the first memory bank 141.

Therefore, when decoding the leftmost decoding target block in the right divided coded picture Pic2, the second decoding circuit 102 obtains the neighborhood information on the left adjacent macroblock (and the above left adjacent macroblock) stored in the first memory bank 141 as left neighborhood information, and decodes the leftmost decoding target block by referencing the left neighborhood information.

The first transfer completion detection unit 104 determines whether or not the right neighborhood information necessary for decoding the rightmost decoding target block has been transferred to the first decoding circuit 101, that is, whether or not the right neighborhood information is stored in the second memory bank 142. When the first transfer completion detection unit 104 determines that the right neighborhood information is stored in the second memory bank 142, the first transfer completion detection unit 104 notifies the first decoding circuit 101 that the right neighborhood information has been transferred.

The second transfer completion detection unit 105 determines whether or not the left neighborhood information necessary for decoding the leftmost decoding target block has been transferred to the second decoding circuit 102, that is, whether or not the left neighborhood information is stored in the first memory bank 141. When the second transfer completion detection unit 105 determines that the left neighborhood information is stored in the first memory bank 141, the second transfer completion detection unit 105 notifies the second decoding circuit 102 that the left neighborhood information has been transferred.

Note that, though the first decoding circuit 101 and the second decoding circuit 102 store all neighborhood information in the first memory bank 141 and the second memory bank 142 in this variation, the first decoding circuit 101 and the second decoding circuit 102 may store only the left neighborhood information and the right neighborhood information in the first memory bank 141 and the second memory bank 142.

Second Variation

A second variation in this embodiment is described below. In an image decoding apparatus according to this variation, left neighborhood information and right neighborhood information are passed between the first decoding circuit 101 and the second decoding circuit 102 in a different manner from the image decoding apparatus 100 in the first embodiment described above, as in the first variation.

Figure 9:
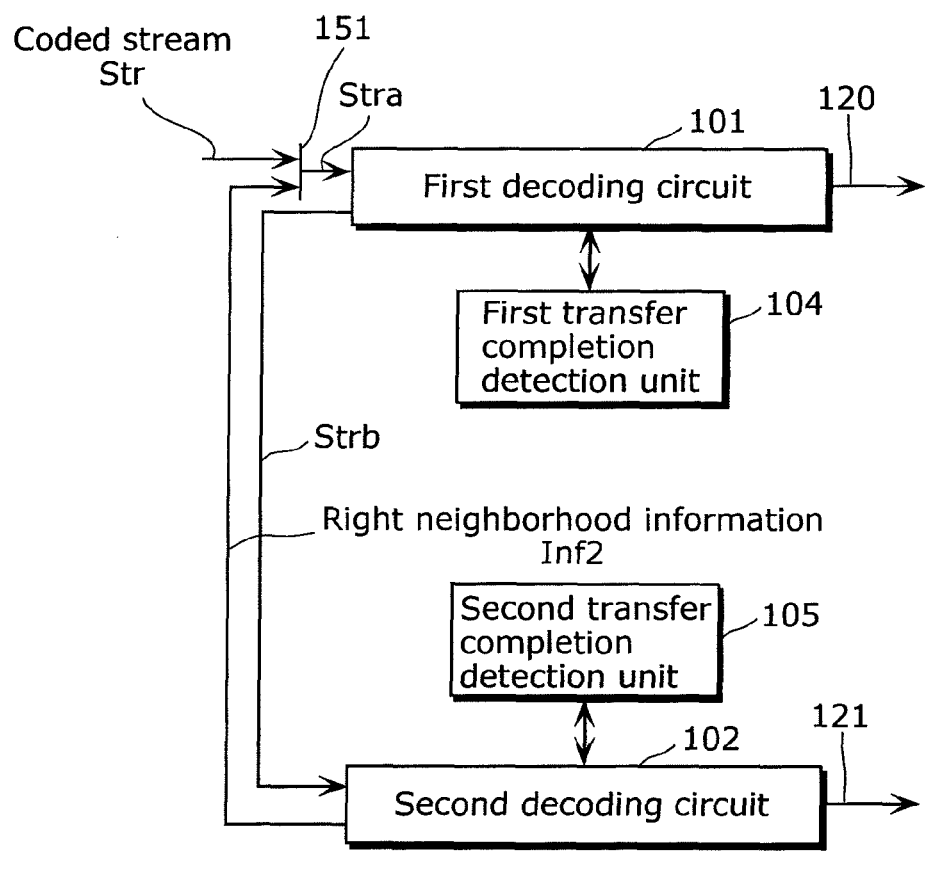
FIG. 9 is a block diagram showing a structure of an image decoding apparatus according to a second variation of the first embodiment of the present invention.

FIG. 9 is a block diagram showing a structure of the image decoding apparatus according to this variation.

An image decoding apparatus 100b according to this variation includes the first decoding circuit 101, the second decoding circuit 102, the first transfer completion detection unit 104, the second transfer completion detection unit 105, and a selector 151. That is, the image decoding apparatus 100b according to this variation does not include the division unit 130 and the information transfer bus 103 as in the image decoding apparatus 100 in the first embodiment described above. The image decoding apparatus 100b according to this variation has a feature that the selector 151 is used so that each of the first and second decoding circuits processes a stream in which right neighborhood information or left neighborhood information is mixed.

Note that, in FIG. 9, components having the same functions and structures as those in the image decoding apparatus 100 in the first embodiment described above are given the same numerals as those in the image decoding apparatus 100, and their detailed description is omitted.

The selector 151 obtains the coded stream Str and outputs the coded stream Str to the first decoding circuit 101. Furthermore, upon obtaining right neighborhood information Inf2 from the second decoding circuit 102 while obtaining the coded stream Str, the selector 151 stops the output of the coded stream Str and outputs the right neighborhood information Inf2. Having completed the output of the right neighborhood information Inf2, the selector 151 resumes the output of the coded stream Str. Thus, the selector 151 selects the coded stream Str or the right neighborhood information Inf2, and outputs it to the first decoding circuit 101. As a result, the selector 151 outputs a selected stream Stra in which the right neighborhood information Inf2 is mixed in the coded stream Str, to the first decoding circuit 101.

The first transfer completion detection unit 104, upon detecting that the right neighborhood information Inf2 has been transferred from the selector 151 to the first decoding circuit 101, notifies the first decoding circuit 101 of the transfer.

The first decoding circuit 101, upon obtaining the selected stream Stra from the selector 151, extracts a part belonging to the left divided coded picture Pic1 from the selected stream Stra and decodes the extracted part. During this, when notified by the first transfer completion detection unit 104 of the transfer of the right neighborhood information Inf2, the first decoding circuit 101 decodes a rightmost decoding target block in the left divided coded picture Pic1 by referencing the right neighborhood information Inf2.

The first decoding circuit 101 further extracts a part belonging to the right divided coded picture Pic2 from the selected stream Stra, and adds left neighborhood information obtained by the aforementioned decoding to the extracted part. The first decoding circuit 101 then outputs a set in which the left neighborhood information is added to the part belonging to the right divided coded picture Pic2, to the second decoding circuit 102 as a processed stream Strb.

The second transfer completion detection unit 105, upon detecting that the left neighborhood information has been transferred from the first decoding circuit 101 to the second decoding circuit 102, notifies the second decoding circuit 102 of the transfer.

The second decoding circuit 102, upon obtaining the processed stream Strb from the first decoding circuit 101, decodes the part belonging to the right divided coded picture Pic2 included in the processed stream Strb. During this, when notified by the second transfer completion detection unit 105 of the transfer of the left neighborhood information, the second decoding circuit 102 decodes a leftmost decoding target block in the right divided coded picture Pic2 by referencing the left neighborhood information. The second decoding circuit 102 further outputs the right neighborhood information Inf2 generated by the decoding, to the first decoding circuit 101.

Figure 10A:
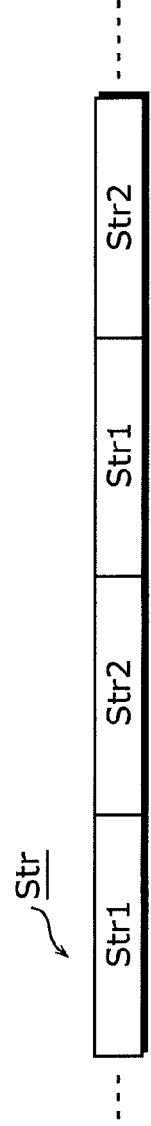
FIG. 10A is a diagram showing a structure of a coded stream according to the second variation of the first embodiment of the present invention.

FIG. 10A is a diagram showing a structure of the coded stream.

The coded stream Str is formed by alternating a partial stream Str1 corresponding to a macroblock line in the left divided coded picture Pic1 and a partial stream Str2 corresponding to a macroblock line in the right divided coded picture Pic2.

Figure 10B:
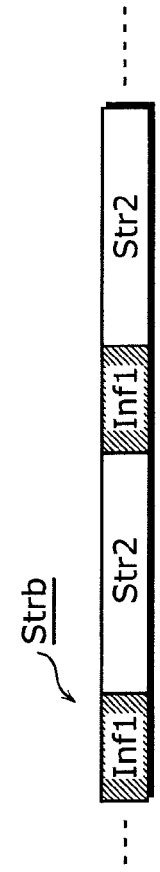
FIG. 10B is a diagram showing a structure of a processed stream according to the second variation of the first embodiment of the present invention.

FIG. 10B is a diagram showing a structure of the processed stream Strb.

The processed stream Strb is formed by alternating the left neighborhood information Inf1 and the partial stream Str2 corresponding to a macroblock line in the right divided coded picture Pic2.

Figure 10C:
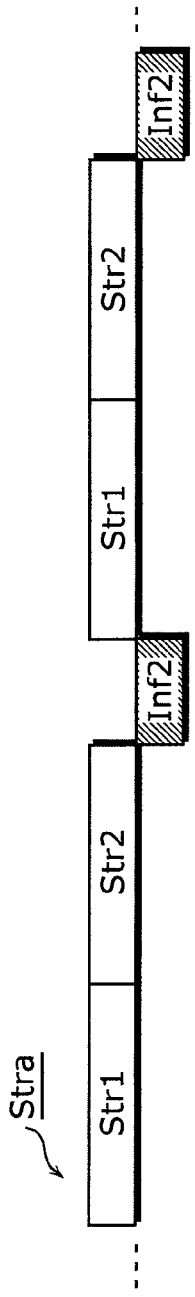
FIG. 10C is a diagram showing a structure of a selected stream according to the second variation of the first embodiment of the present invention.

FIG. 10C is a diagram showing a structure of the selected stream Stra.

The selected steam Stra is formed by alternating the partial stream Str1 and the partial stream Str2 included in the coded stream Str, and the right neighborhood information Inf2.

Thus, in this variation, neighborhood information is added to a stream that includes all or part of the coded picture Pic and input in each of the first decoding circuit 101 and the second decoding circuit 102.

Third Variation

A third variation in this embodiment is described below. The image decoding apparatus 100 according to this variation has a feature that it supports MBAFF (Macro Block Adaptive Frame Field).

Figure 11A:
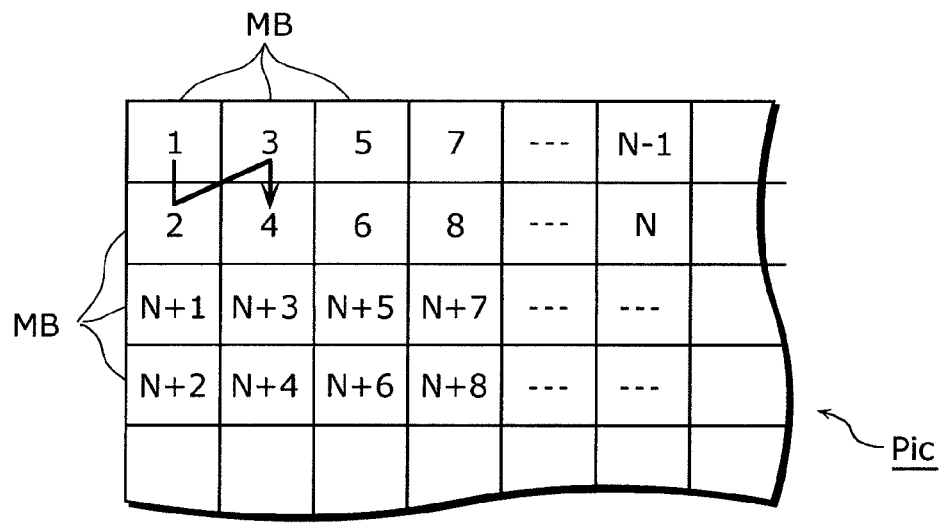
FIG. 11A is a diagram showing a decoding order of macroblocks in the case where a coded picture is a MBAFF picture according to a third variation of the first embodiment of the present invention.

FIG. 11A is a diagram showing a decoding order of macroblocks in the case where the coded picture Pic is a MBAFF picture. Note that the numbers (N is an integer equal to or more than 2) shown in macroblocks MB in FIG. 11A indicate an order in which the macroblocks are decoded.

In the case where the coded picture Pic is a MBAFF picture, it is necessary to decode the coded picture Pic in units of two macroblock lines. In detail, it is necessary to decode the first macroblock MB, then decode the second macroblock adjacent below to the first macroblock, then decode the third macroblock adjacent above right to the second macroblock, and then decode the fourth macroblock adjacent below to the third macroblock.

This being the case, the first decoding circuit 101 and the second decoding circuit 102 in the image decoding apparatus 100 according to this variation each decode macroblocks in the order shown in FIG. 11A mentioned above, in the left divided coded picture Pic1 or the right divided coded picture Pic2.

Figure 11B:
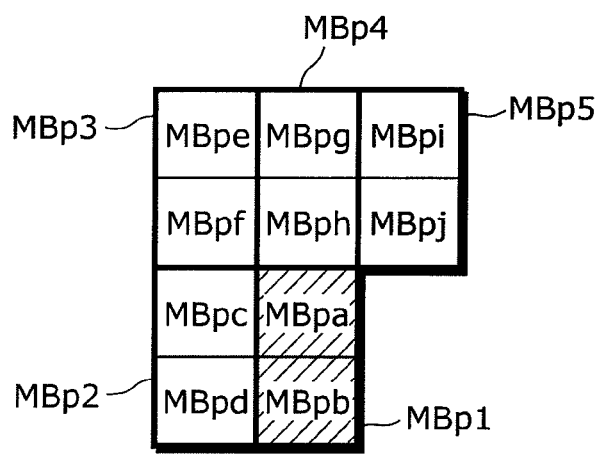
FIG. 11B is an explanatory diagram for explaining neighborhood information in the case where the coded picture is a MBAFF picture according to the third variation of the first embodiment of the present invention.

FIG. 11B is an explanatory diagram for explaining neighborhood information n the case where the coded picture Pic is a MBAFF picture.

As an example, each of the first decoding circuit 101 and the second decoding circuit 102 decodes a macroblock pair MBp1 made up of macroblocks MBpa and MBpb that are adjacent above and below to each other. When doing so, each of the first decoding circuit 101 and the second decoding circuit 102 references neighborhood information showing decoding results of four macroblock pairs MBp2 to MBp5 that are adjacent to the macroblock pair MBp1. Here, the macroblock pair MBp2 is made up of macroblocks MBpc and MBpd, and is adjacent left to the macroblock pair MBp1. The macroblock pair MBp3 is made up of macroblocks MBpe and MBpf, and is adjacent above left to the macroblock pair MBp1. The macroblock pair MBp4 is made up of macroblocks MBpg and MBph, and is adjacent above to the macroblock pair MBp1. The macroblock pair MBp5 is made up of macroblocks MBpi and MBpj, and is adjacent above right to the macroblock pair MBp1.

That is, the image decoding apparatus 100 according to this variation can achieve the same advantages as the aforementioned embodiment by treating two macroblocks adjacent above and below to each other as one macroblock, in the case where the coded picture is a MBAFF picture.

Second Embodiment

An image coding apparatus in this embodiment is an apparatus that codes a picture per macroblock according to H.264, and has the same features as the image decoding apparatus in the first embodiment. The only difference between the image coding apparatus in this embodiment and the image decoding apparatus in the first embodiment is whether macroblocks are coded or decoded. The following describes the image coding apparatus in this embodiment in detail, with reference to FIGS. 12 to 16.

Figure 12:
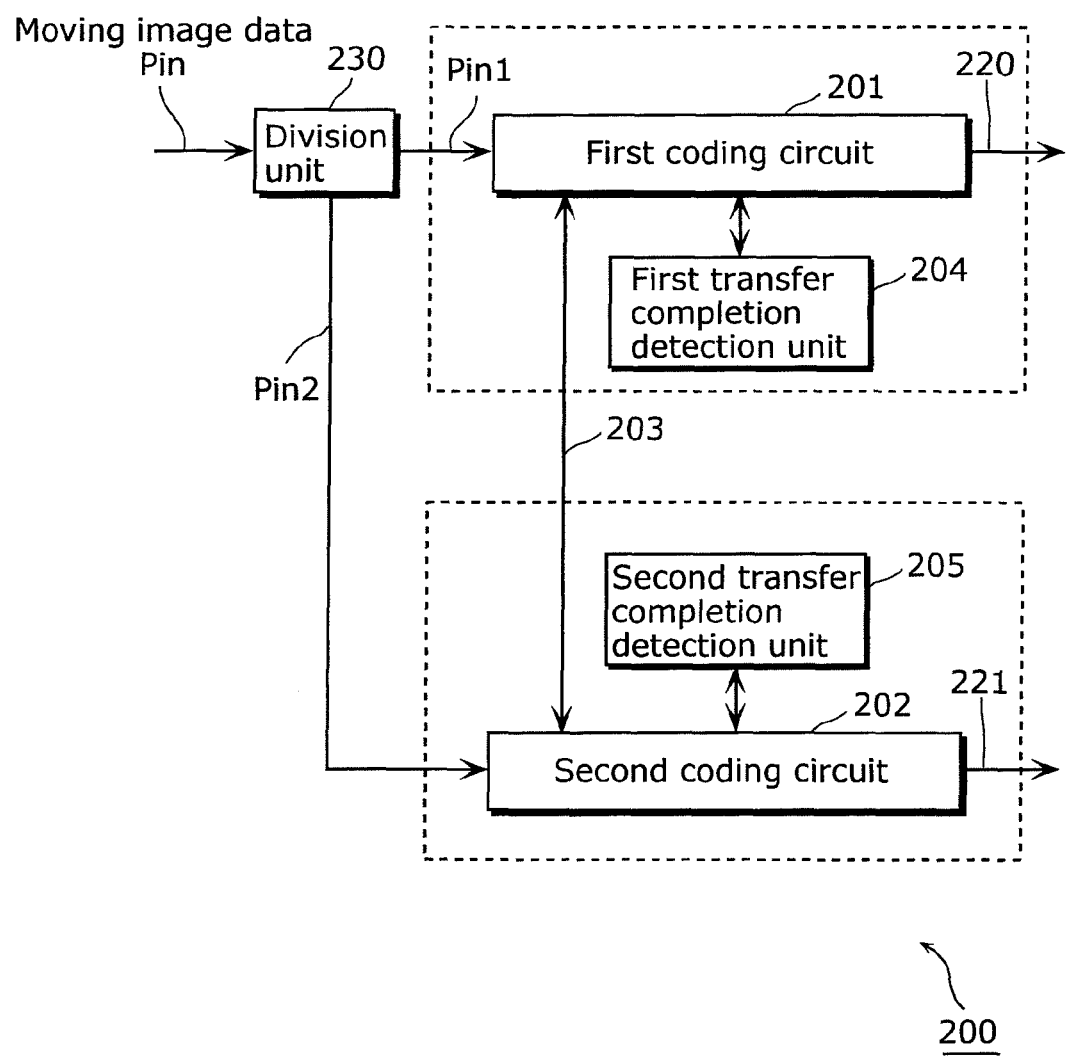
FIG. 12 is a block diagram showing a structure of a moving image coding apparatus in a second embodiment of the present invention.

FIG. 12 is a block diagram showing a structure of the image coding apparatus in the second embodiment of the present invention.

An image coding apparatus 200 in this embodiment includes: a division unit 230 that divides moving image data Pin and outputs divided moving image data Pin1 and Pin2; a first coding circuit 201 that codes the divided moving image data Pint; a second coding circuit 202 that codes the other divided moving image data Pin2 in parallel with the coding process by the first coding circuit 201; an information transfer bus 203 for transferring information between the first coding circuit 201 and the second coding circuit 202; and a first transfer completion detection unit 204 and a second transfer completion detection unit 205 that detect completion of information transfer performed between the first coding circuit 201 and the second coding circuit 202.

Note that the first coding circuit 201 and the first transfer completion detection unit 204 may be constructed as one integrated circuit such as LSI (Large Scale Integration), as shown by a dotted box in FIG. 12. Likewise, the second coding circuit 202 and the second transfer completion detection unit 205 may be constructed as one integrated circuit such as LSI. In this embodiment, the coding by the first coding circuit 201 and the second coding circuit 202 also includes local decoding, that is, decoding of a coded image for coding another image. Moreover, in this embodiment, each of the first coding circuit 201 and the second coding circuit 202 includes a transfer unit that transfers left neighborhood information or right neighborhood information (transfer target neighborhood information) to the other coding circuit via the information transfer bus 203.

The division unit 230 divides the moving image data Pin so that a left part (left divided picture) of each picture in the moving image data Pin is included in the divided moving image data Pin1 and a right part (right divided picture) which remains is included in the divided moving image data Pint. Note that the division unit 230 divides the moving image data Pin on the basis of macroblock (MB) addresses of macroblocks included in each picture.

The first coding circuit 201 obtains the divided moving image data Pin1 from the division unit 230 and codes the divided moving image data Pin1. In detail, the first coding circuit 201 sequentially codes left divided pictures included in the divided moving image data Pin1. When doing so, the first coding circuit 201 codes each left divided picture per macroblock line, downward from a top macroblock line in the left divided picture. When coding the macroblock line, the first coding circuit 201 sequentially codes macroblocks rightward from a leftmost macroblock, that is, in a horizontal direction. The first coding circuit 201 then outputs output data 220 that is composed of a divided coded stream or local decoded image data generated by the aforementioned coding.

Furthermore, having coded a rightmost macroblock in the left divided picture, the first coding circuit 201 transfers left neighborhood information generated by the coding to the second coding circuit 202 via the information transfer bus 203 so that adjacent macroblock dependencies are satisfied in the coding process by the second coding circuit 202.

Note that an adjacent macroblock is any of a left adjacent macroblock that is adjacent left to a coding target macroblock, an above left adjacent macroblock that is adjacent above left to the coding target macroblock, an above adjacent macroblock that is adjacent above to the coding target macroblock, and an above right adjacent macroblock that is adjacent above right to the coding target macroblock. Adjacent macroblock dependencies denote such relationships that, when an adjacent macroblock is present in the picture, the coding (motion vector prediction coding, intra-picture prediction coding, or deblocking filter processing) of the coding target macroblock is performed by referencing neighborhood information showing a coding result of the adjacent macroblock. Note that the four adjacent macroblocks mentioned above represent a maximum range of neighborhood information that can be referenced, and all neighborhood information may not necessarily be referenced. Moreover, neighborhood information is a motion vector and a coded and decoded pixel value of an adjacent macroblock in the case where the coding target macroblock is inter-picture prediction coded, and the coded and decoded pixel value of the adjacent macroblock in the case where the coding target macroblock is intra-picture prediction coded. Left neighborhood information is neighborhood information on a left adjacent macroblock in the left divided picture in the case where the coding target macroblock is a top leftmost macroblock in the right divided picture, and neighborhood information on a left adjacent macroblock and an above left adjacent macroblock in the left divided picture in the case where the coding target macroblock is a leftmost macroblock in the right divided picture except the top leftmost macroblock.

Note that, in this embodiment, not only information defined in a coding system such as H.264 but also other information may be included in neighborhood information. For instance, a used bit amount for controlling a coded stream and data obtained by extracting a feature of a picture pattern of an adjacent macroblock and the like may be included in neighborhood information.

The second coding circuit 202 obtains the divided moving image data Pin2 from the division unit 230 and codes the divided moving image data Pin2. In detail, the second coding circuit 202 sequentially codes right divided pictures included in the divided moving image data Pin2. When doing so, the second coding circuit 202 codes each right divided picture per macroblock line, downward from a top macroblock line in the right divided picture. Note that the macroblock line referred to here is a group composed of a plurality of macroblocks aligned in the horizontal direction in the right divided picture. When coding the macroblock line, the second coding circuit 202 sequentially codes macroblocks rightward from a leftmost macroblock, that is, in the horizontal direction. The second coding circuit 202 then outputs output data 221 that is composed of a divided coded stream or local decoded image data generated by the aforementioned coding.

Furthermore, having coded a leftmost macroblock in the right divided picture, the second coding circuit 202 transfers right neighborhood information generated by the coding to the first coding circuit 201 via the information transfer bus 203 so that adjacent macroblock dependencies are satisfied in the coding process by the first coding circuit 201. Note that right neighborhood information is neighborhood information on an above right adjacent macroblock in the right divided picture in the case where the coding target macroblock is a rightmost macroblock in the left divided picture except a top rightmost macroblock.

The first transfer completion detection unit 204, upon detecting that right neighborhood information necessary for the coding process by the first coding circuit 201 has been transferred from the second coding circuit 202 to the first coding circuit 201, notifies the first coding circuit 201 of the transfer. When the first coding circuit 201 codes a rightmost macroblock (rightmost coding target block) in the left divided picture, in the case where a macroblock (above right adjacent macroblock) adjacent above right to the rightmost coding target block is present in the right divided picture, right neighborhood information on the above right adjacent macroblock is needed. Accordingly, upon detecting the transfer of the right neighborhood information on the above right adjacent macroblock, the first transfer completion detection unit 204 notifies the first coding circuit 201 of the transfer, thereby causing the first coding circuit 201 to start coding the rightmost coding target block. In other words, when coding the rightmost coding target block, the first coding circuit 201 waits without performing the coding unless notified from the first transfer completion detection unit 204, and starts the coding upon receiving the notification.

The second transfer completion detection unit 205, upon detecting that left neighborhood information necessary for the coding process by the second coding circuit 202 has been transferred from the first coding circuit 201 to the second coding circuit 202, notifies the second coding circuit 202 of the transfer. When the second coding circuit 202 codes a leftmost macroblock (leftmost coding target block) in the right divided picture, in the case where a macroblock (above left adjacent macroblock) adjacent above left to the leftmost coding target block and a macroblock (left adjacent macroblock) adjacent left to the leftmost coding target block are present in the left divided picture, left neighborhood information on the above left adjacent macroblock and the left adjacent macroblock is needed. On the other hand, in the case where the above left adjacent macroblock is not present and only the left adjacent macroblock is present in the left divided picture, left neighborhood information on the left adjacent macroblock is needed. Accordingly, upon detecting the transfer of the left neighborhood information on the above left adjacent macroblock and the left adjacent macroblock or the transfer of only the left neighborhood information on the left adjacent macroblock, the second transfer completion detection unit 205 notifies the second coding circuit 202 of the transfer, thereby causing the second coding circuit 202 to start coding the leftmost coding target block. In other words, when coding the leftmost coding target block, the second coding circuit 202 waits without performing the coding unless notified from the second transfer completion detection unit 205, and starts the coding upon receiving the notification.

In such an image coding apparatus 200, having coded a macroblock, the first coding circuit 201 stores information obtained by the coding in a memory included in the first coding circuit 201, as neighborhood information necessary for coding another macroblock. Upon coding a macroblock, when any of four adjacent macroblocks (left adjacent macroblock, above left adjacent macroblock, above adjacent macroblock, and above right adjacent macroblock) which are adjacent to the macroblock is present in the picture, the first coding circuit 201 codes the coding target macroblock by referencing neighborhood information obtained by coding the adjacent macroblock and stored in the memory. However, in the case where the adjacent macroblock in the picture is not coded by the first coding circuit 201 but coded by the second coding circuit 202, the neighborhood information on the adjacent macroblock is not stored in the memory in the first coding circuit 201. In this case, the first coding circuit 201 obtains the neighborhood information on the adjacent macroblock transferred from the second coding circuit 202 as right neighborhood information, and stores the right neighborhood information in the memory. When the first coding circuit 201 has neighborhood information on all adjacent macroblocks present in the picture, the first coding circuit 201 codes the coding target macroblock by referencing all neighborhood information including the right neighborhood information.

Likewise, having coded a macroblock, the second coding circuit 202 stores information obtained by the coding in a memory included in the second coding circuit 202, as neighborhood information necessary for coding another macroblock. Upon coding a macroblock, when any of four adjacent macroblocks (left adjacent macroblock, above left adjacent macroblock, above adjacent macroblock, and above right adjacent macroblock) which are adjacent to the macroblock is present in the picture, the second coding circuit 202 codes the coding target macroblock by referencing neighborhood information obtained by coding the adjacent macroblock and stored in the memory. However, in the case where the adjacent macroblock in the picture is not coded by the second coding circuit 202 but coded by the first coding circuit 201, the neighborhood information on the adjacent macroblock is not stored in the memory in the second coding circuit 202. In this case, the second coding circuit 202 obtains the neighborhood information on the adjacent macroblock transferred from the first coding circuit 201 as left neighborhood information, and stores the left neighborhood information in the memory. When the second coding circuit 202 has neighborhood information on all adjacent macroblocks present in the picture, the second coding circuit 202 codes the coding target macroblock by referencing all neighborhood information including the left neighborhood information.

Thus, in the image coding apparatus 200 in this embodiment, by transferring the left neighborhood information and the right neighborhood information between the first coding circuit 201 and the second coding circuit 202, it is possible to realize macroblock coding in conformity with H.264 that uses coding results of adjacent macroblocks.

Figure 13:
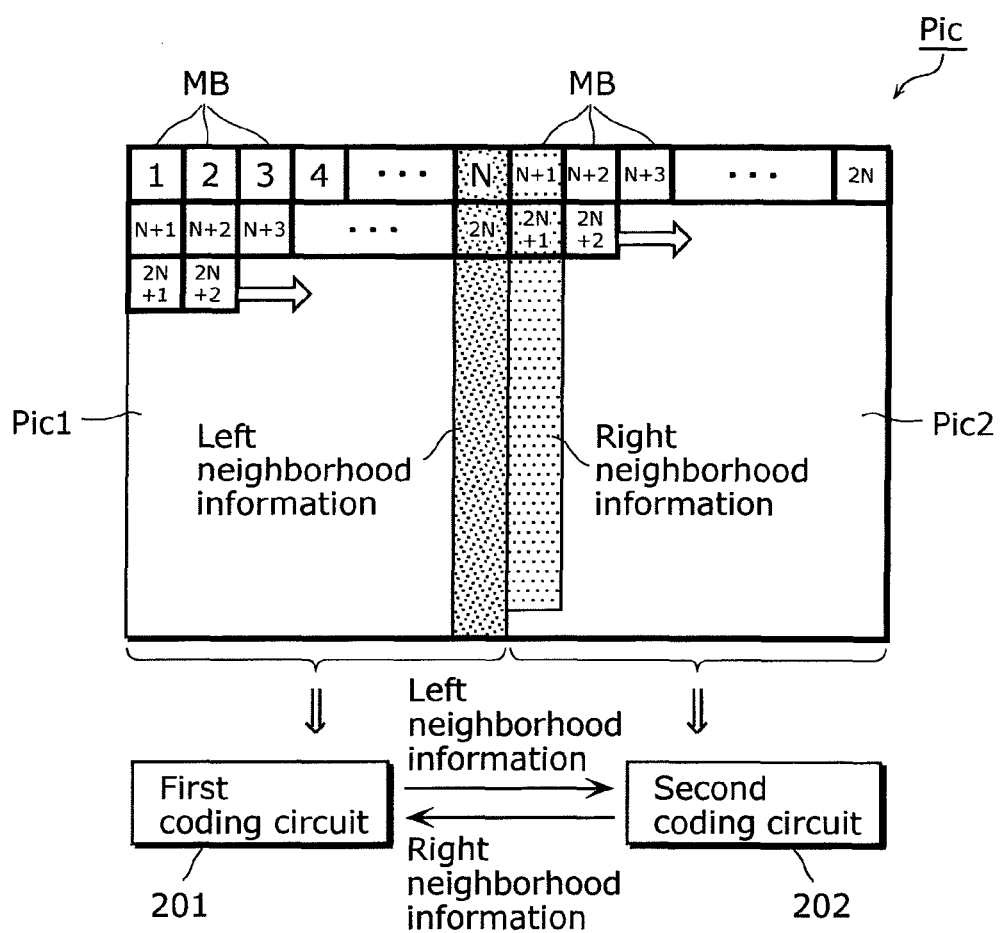
FIG. 13 is an explanatory diagram for explaining an operation of the image coding apparatus in the second embodiment of the present invention.

FIG. 13 is an explanatory diagram for explaining an operation of the image coding apparatus 200 in this embodiment.

The division unit 230 divides a picture Pic by two into left and right, to generate a left divided picture Pic1 and a right divided picture Pic2.

Here, the picture Pic is composed of a plurality of macroblocks MB arranged in the horizontal and vertical directions. When coding a macroblock line in the picture Pic, the first coding circuit 201 and the second coding circuit 202 sequentially code a plurality of macroblocks in the horizontal direction. Note that the numbers from 1 to 2N+2 (N is an integer equal to or more than 2) shown in the macroblocks MB in FIG. 13 roughly indicate an order in which the macroblocks are coded. This being so, the division unit 230 divides the picture Pic in a direction orthogonal to the direction in which the macroblocks are coded by the first coding circuit 201 and the second coding circuit 202. That is, the division unit 230 divides the picture Pic so that a boundary line between the left divided picture Pic1 and the right divided picture Pic2 is orthogonal to the aforementioned coding direction.

Note that the division unit 230 in this embodiment divides the picture Pic so that the left divided picture Pic1 and the right divided picture Pic2 have the same size. As a result, the number of macroblocks included in each macroblock line is N in both the left divided picture Pic1 and the right divided picture Pic2.

The first coding circuit 201 codes the left divided picture Pic1, and the second coding circuit 202 codes the right divided picture Pic2.

In detail, first, the first coding circuit 201 sequentially codes macroblocks MB from a top leftmost macroblock MB (1st) to a top rightmost macroblock MB (Nth) in a top macroblock line in the left divided picture Pic1. Since the Nth macroblock MB is a rightmost macroblock in the left divided picture Pic1, the first coding circuit 201 transfers left neighborhood information obtained by coding the Nth macroblock MB to the second coding circuit 202.

Next, the first coding circuit 201 sequentially codes macroblocks MB from a (N+1)th macroblock MB to a 2Nth macroblock MB in a macroblock line second from the top in the left divided picture Pic1. At this time, the second coding circuit 202 sequentially codes macroblocks MB from a top leftmost macroblock MB ((N+1)th) to a top rightmost macroblock MB (2Nth) in a top macroblock line in the right divided picture Pic2. That is, the first coding circuit 201 and the second coding circuit 202 execute the coding of the macroblock line second from the top in the left divided picture Pic1 and the coding of the top macroblock line in the right divided picture Pic2, in parallel.

Here, when the second coding circuit 202 codes the (N+1)th macroblock MB in the right divided picture Pic2, this macroblock MB is a leftmost coding target block, so that left neighborhood information for coding the leftmost coding target block MB is needed. In the picture Pic, the Nth macroblock MB in the left divided picture Pic1 is adjacent to the leftmost coding target block MB ((N+1)th), as a left adjacent macroblock. This being so, to code the aforementioned (N+1)th leftmost coding target block, the second coding circuit 202 needs left neighborhood information showing a coding result of the left adjacent macroblock. Accordingly, the second coding circuit 202 waits without coding the leftmost coding target block until notified of the transfer of the left neighborhood information on the left adjacent macroblock from the first coding circuit 201, and performs the coding after receiving the notification.

Meanwhile, when the first coding circuit 201 codes the 2Nth macroblock MB in the left divided picture Pic1, this macroblock MB is a rightmost coding target block, so that right neighborhood information for coding the rightmost coding target block is needed. In the picture Pic, the (N+1)th macroblock MB in the right divided picture Pic2 is adjacent to the rightmost coding target block MB (2Nth), as an above right adjacent macroblock. This being so, to code the aforementioned 2Nth rightmost coding target block, the first coding circuit 201 needs right neighborhood information showing a coding result of the above right adjacent macroblock. Accordingly, the first coding circuit 201 waits without coding the rightmost coding target block until notified of the transfer of the right neighborhood information on the above right adjacent macroblock from the second coding circuit 202, and performs the coding after receiving the notification.

Next, the first coding circuit 201 sequentially codes macroblocks MB from a (2N+1)th macroblock MB to a 3Nth macroblock MB in a macroblock line third from the top in the left divided picture Pic1. At this time, the second coding circuit 202 sequentially codes macroblocks MB from a (2N+1)th macroblock MB to a 3Nth macroblock MB in a macroblock line second from the top in the right divided picture Pic2. Thus, the first coding circuit 201 and the second coding circuit 202 execute the coding of the macroblock line third from the top in the left divided picture Pic1 and the coding of the macroblock line second from the top in the right divided picture Pic2, in parallel.

Here, when the second coding circuit 202 codes the (2N+1)th macroblock MB in the right divided picture Pic2, this macroblock MB is a leftmost coding target block, so that left neighborhood information for coding the leftmost coding target block MB is needed. In the picture Pic, the Nth macroblock MB in the left divided picture Pic1 is adjacent to the leftmost coding target block MB ((2N+1)th), as an above left adjacent macroblock. In addition, the 2Nth macroblock MB in the left divided picture Pic1 is adjacent to the leftmost coding target block MB ((2N+1)th), as a left adjacent macroblock. This being so, to code the aforementioned (2N+1)th leftmost coding target block, the second coding circuit 202 needs left neighborhood information showing coding results of the left adjacent macroblock and the above left adjacent macroblock. Accordingly, the second coding circuit 202 waits without coding the leftmost coding target block until notified of the transfer of the left neighborhood information on the left adjacent macroblock and the above left adjacent macroblock from the first coding circuit 201, and performs the coding after receiving the notification.

Figure 14:
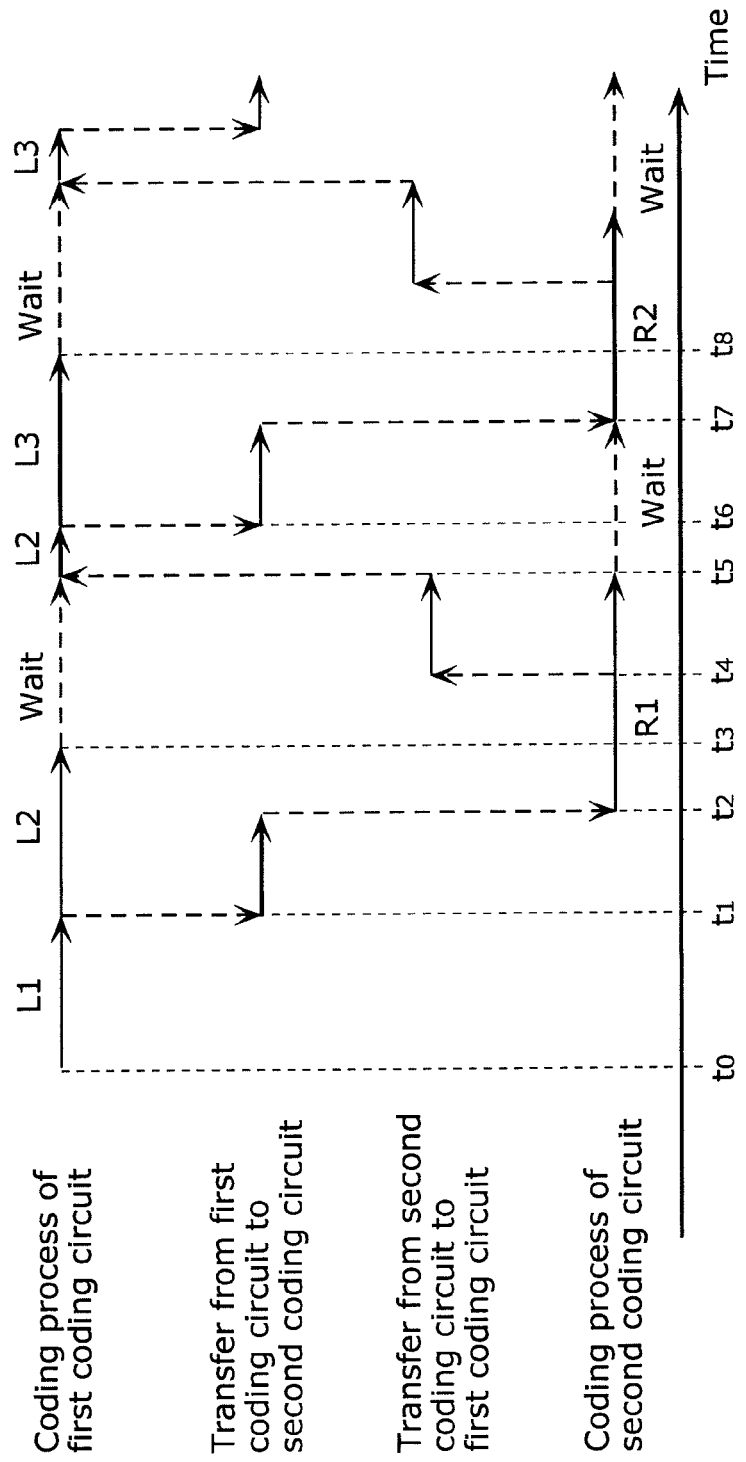
FIG. 14 is a diagram showing an example of processing timings of a first coding circuit and a second coding circuit in the second embodiment of the present invention.

FIG. 14 is a diagram showing an example of processing timings of the first coding circuit 201 and the second coding circuit 202. Note that the timings shown in FIG. 14 are merely an example for illustrating processing operations of the first coding circuit 201 and the second coding circuit 202 in an easily understood manner.

First, the first coding circuit 201 starts coding a top macroblock line L1 in the left divided picture Pic1, at time t0. When the coding of the macroblock line L1 ends at time t1, the first coding circuit 201 transfers left neighborhood information showing a coding result of a rightmost coding target block to the second coding circuit 202. Further, the first coding circuit 201 starts coding a macroblock line L2 second from the top in the left divided picture Pic1. Meanwhile, upon obtaining the left neighborhood information transferred from the first coding circuit 201 at time t2, the second coding circuit 202 starts coding a top macroblock line R1 in the right divided picture Pic2 by referencing the left neighborhood information.

Here, after coding a macroblock second from the right in the macroblock line L2, the first coding circuit 201 stops the coding process and enters a wait state from time t3, since there is no right neighborhood information necessary for coding the next coding target macroblock (rightmost coding target block). On the other hand, having coded a leftmost coding target block in the macroblock line R1 at time t4, the second coding circuit 202 transfers right neighborhood information showing a result of the coding to the first coding circuit 201.

When the first coding circuit 201 obtains the right neighborhood information from the second coding circuit 202 and is notified by the first transfer completion detection unit 204 of the transfer of the right neighborhood information to the first coding circuit 201 at time t5, the first coding circuit 201 clears the wait state and codes the rightmost coding target block in the macroblock line L2 by referencing the right neighborhood information. Meanwhile, the second coding circuit 202 completes the coding of the macroblock line R1 at time t5, and tries to start coding the next macroblock line R2. However, since there is no left neighborhood information necessary for coding a leftmost coding target block in the macroblock line R2, the second coding circuit 202 stops the coding process and enters a wait state from time t5.

Upon completing the coding of the rightmost coding target block in the macroblock line L2 at time t6, the first coding circuit 201 transfers left neighborhood information showing a result of the coding to the second coding circuit 202. Further, the first coding circuit 201 starts coding the next macroblock line L3. Meanwhile, when the second coding circuit 202 obtains the left neighborhood information from the first coding circuit 201 and is notified by the second transfer completion detection unit 205 of the transfer of the left neighborhood information to the second coding circuit 202 at time t7, the second coding circuit 202 clears the wait state and starts coding the macroblock line R2 by referencing the left neighborhood information, thereby coding the leftmost coding target block.

Subsequently, after coding a macroblock second from the right in the macroblock line L3, the first coding circuit 201 stops the coding process and enters a wait state from time t8, since there is no right neighborhood information necessary for coding the next coding target macroblock (rightmost coding target block).

Figure 15:
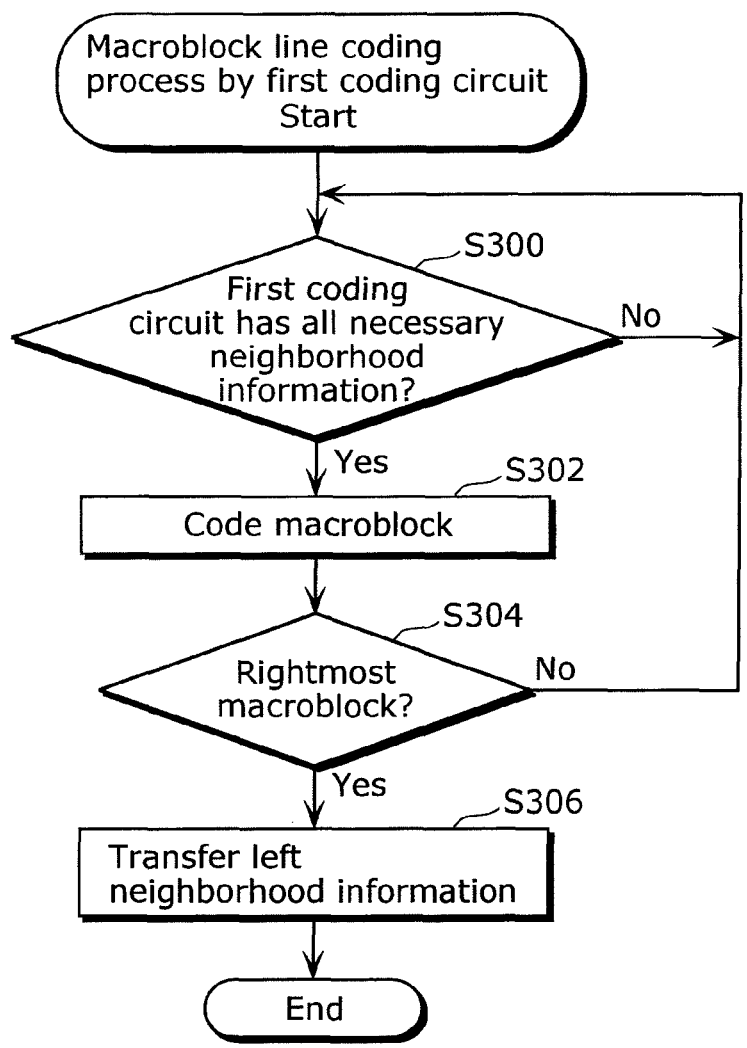
FIG. 15 is a flowchart showing an operation when the first coding circuit codes a macroblock line in the second embodiment of the present invention.

FIG. 15 is a flowchart showing an operation when the first coding circuit 201 codes a macroblock line.

First, the first coding circuit 201 determines whether or not the first coding circuit 201 has all neighborhood information necessary for coding a coding target macroblock (Step S300).

For example, in the case where the coding target macroblock is a rightmost coding target block, the first coding circuit 201 determines whether or not the transfer of right neighborhood information is notified by the first transfer completion detection unit 204. When the first coding circuit 201 determines that it has all necessary neighborhood information (Step S300: Yes), the first coding circuit 201 codes the coding target macroblock by referencing the neighborhood information (Step S302). When the first coding circuit 201 determines that it does not have all necessary neighborhood information (Step S300: No), on the other hand, the first coding circuit 201 waits because the coding target macroblock cannot be coded.

After coding the coding target macroblock in Step S302, the first coding circuit 201 determines whether or not the coded macroblock is a rightmost macroblock in the macroblock line (Step S304). When the first coding circuit 201 determines that the coded macroblock is the rightmost macroblock (Step S304: Yes), the first coding circuit 201 transfers left neighborhood information showing a result of coding the rightmost macroblock, to the second coding circuit 202 (Step S306). When the first coding circuit 201 determines that the coded macroblock is not the rightmost macroblock (Step S304: No), on the other hand, the first coding circuit 201 sets a macroblock adjacent right to the coded macroblock as the next coding target macroblock, and repeats the process from Step S300. The macroblock line is coded in this way. By repeating such macroblock line coding, the left divided picture Pic1 of the picture Pic is coded.

Figure 16:
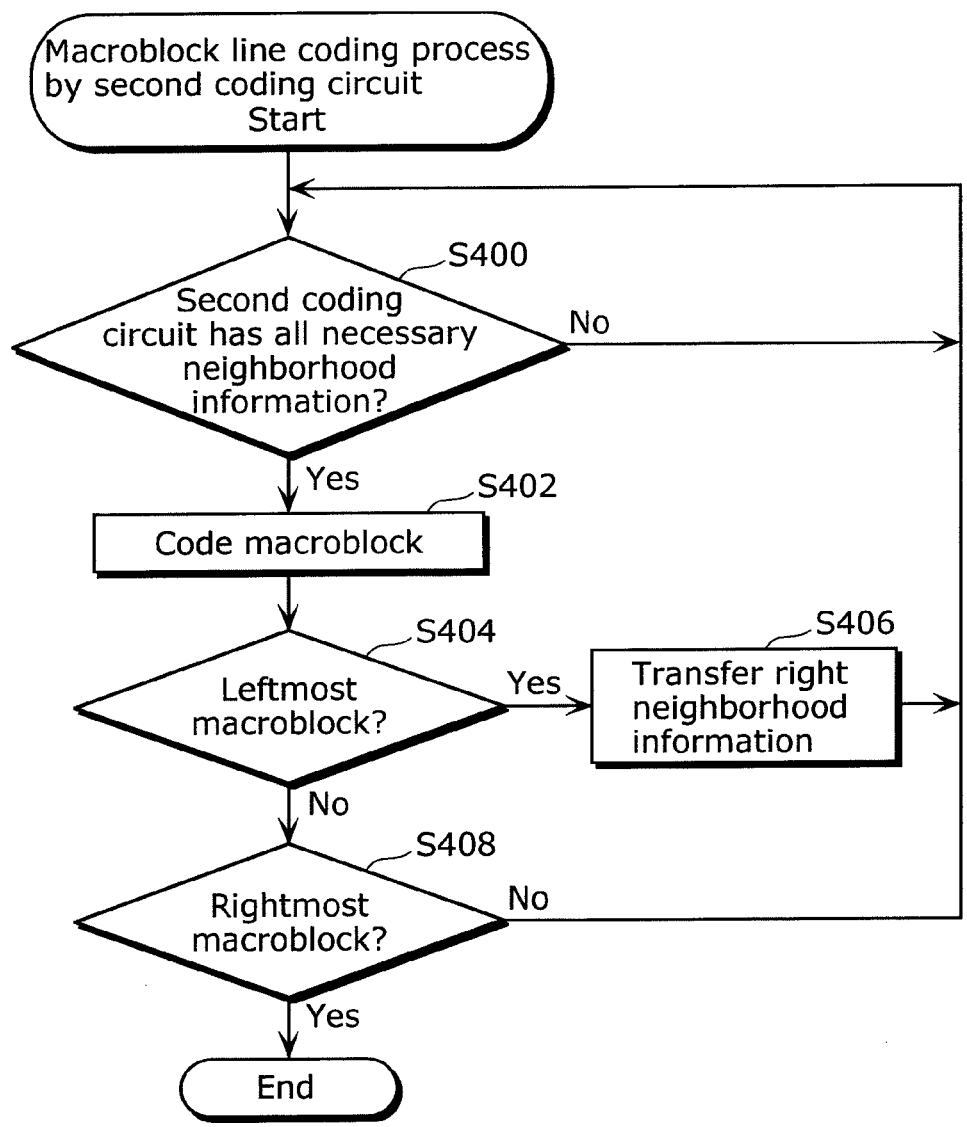
FIG. 16 is a flowchart showing an operation when the second coding circuit codes a macroblock line in the second embodiment of the present invention.

FIG. 16 is a flowchart showing an operation when the second coding circuit 202 codes a macroblock line.

First, the second coding circuit 202 determines whether or not the second coding circuit 202 has all neighborhood information necessary for coding a coding target macroblock (Step S400). For example, in the case where the coding target macroblock is a leftmost coding target block, the second coding circuit 202 determines whether or not the transfer of left neighborhood information is notified by the second transfer completion detection unit 205. When the second coding circuit 202 determines that it has all necessary neighborhood information (Step S400: Yes), the second coding circuit 202 codes the coding target macroblock by referencing the neighborhood information (Step S402). When the second coding circuit 202 determines that it does not have all necessary neighborhood information (Step S400: No), on the other hand, the second coding circuit 202 waits because the coding target macroblock cannot be coded.

After coding the coding target macroblock in Step S402, the second coding circuit 202 determines whether or not the coded macroblock is a leftmost macroblock in the macroblock line (Step S404). When the second coding circuit 202 determines that the coded macroblock is the leftmost macroblock (Step S404: Yes), the second coding circuit 202 transfers right neighborhood information showing a result of coding the leftmost macroblock, to the first coding circuit 201 (Step S406). When the second coding circuit 202 determines that the coded macroblock is not the leftmost macroblock (Step S404: No), on the other hand, the second coding circuit 202 further determines whether or not the coded macroblock is a rightmost macroblock in the macroblock line (Step S408). When the second coding circuit 202 determines that the coded macroblock is the rightmost macroblock (Step S408: Yes), the coding process of the macroblock line is completed. When the second coding circuit 202 determines that the coded macroblock is not the rightmost macroblock (Step S408: No), the second coding circuit 202 sets a macroblock adjacent right to the coded macroblock as the next coding target macroblock, and repeats the process from Step S400.

The macroblock line is coded in this way. By repeating such macroblock line coding, the right divided picture Pic2 of the picture Pic is coded.

As described above, in this embodiment, the boundary line between the regions (the left divided picture Pic1 and the right divided picture Pic2) is orthogonal to the coding direction. Accordingly, in parallel coding of images in these regions, there is no need to transfer neighborhood information each time a macroblock is coded in a process of sequentially coding all macroblocks in the picture Pic, and neighborhood information is transferred as left neighborhood information or right neighborhood information only when a macroblock including a part of the boundary line is coded. Thus, there is no need to frequently transfer neighborhood information as is conventionally done, so that a lower transfer frequency can be attained. As a result, even in a coding system such as H.264 that requires neighborhood information for macroblock coding, overhead of parallel processing can be suppressed to improve parallelization efficiency, while resolving adjacent macroblock dependencies. In addition, conventionally, coding units as many as macroblock lines are needed and memories as many as the coding units are needed to store neighborhood information generated by the corresponding coding units, which requires a large memory size. In this embodiment, however, the number of coding units can be reduced, and so the memory size used in the whole apparatus can be reduced. This contributes to a reduction in circuit cost, higher performance, and lower cost.

Third Embodiment

This embodiment is an application of the image decoding apparatus in the first embodiment and the image coding apparatus in the second embodiment, namely, an AV processing unit that realizes a H.264 recorder.

Figure 17:
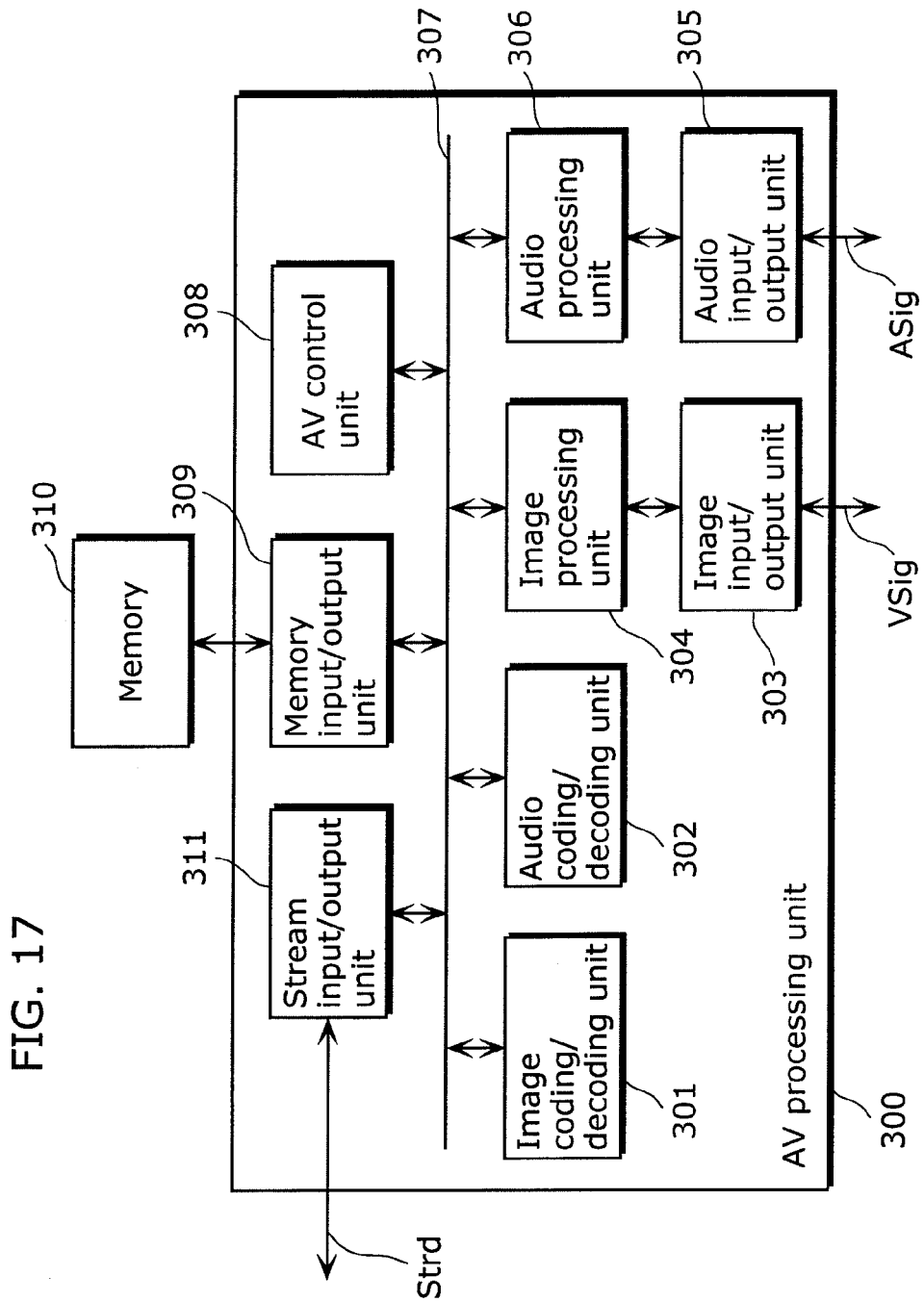
FIG. 17 is a block diagram of an AV processing unit that realizes a H.264 recorder in a third embodiment of the present invention.
Figure 18:
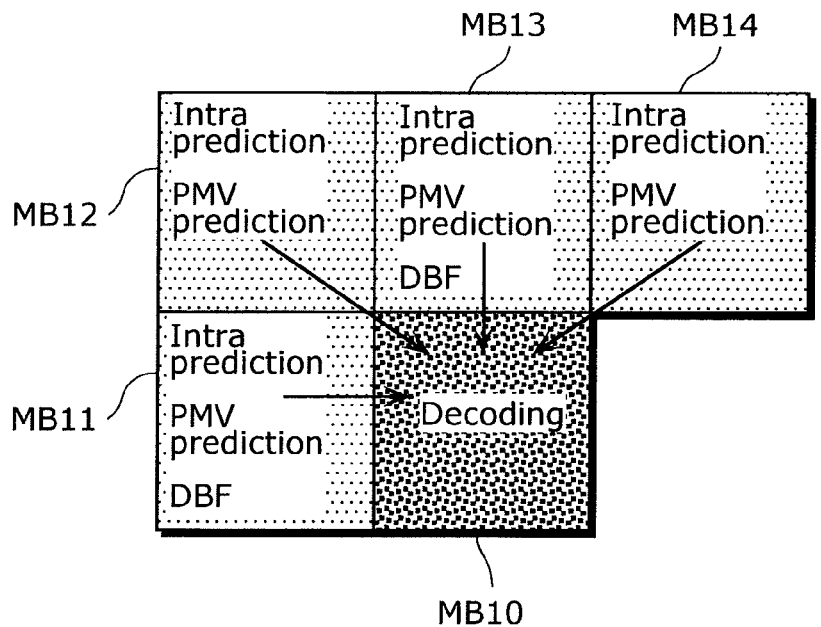
FIG. 18 is a diagram showing adjacent macroblock dependencies in H.264.
Figure 19:
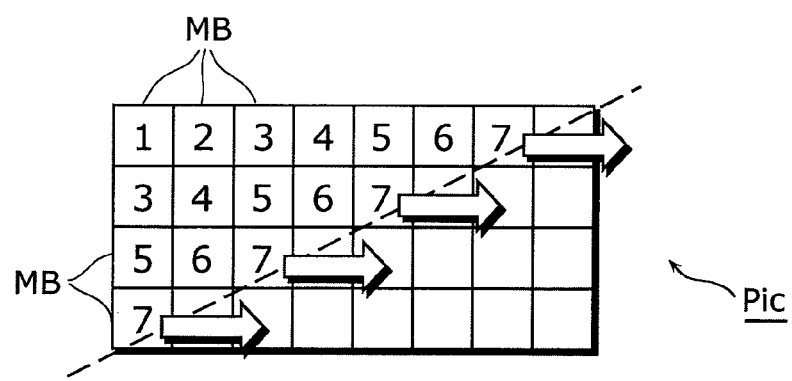
FIG. 19 is a diagram showing a processing procedure of an image decoding apparatus and an image coding apparatus described in Patent Reference 1.

FIG. 17 is a block diagram of the AV processing unit.

An AV processing unit 300 in this embodiment is an AV processing unit that reproduces digitally compressed audio and images such as a DVD recorder and a hard disk recorder, and is constructed as an integrated circuit such as LSI. This AV processing unit 300 includes an image coding/decoding unit 301 having the functions and structures of the image decoding apparatus and the image coding apparatus in the first and second embodiments described above, an audio coding/decoding unit 302, an image input/output unit 303, an image processing unit 304, an audio input/output unit 305, an audio processing unit 306, a bus 307, an AV control unit 308, a memory input/output unit 309, and a stream input/output unit 311.

A memory 310 has an area for storing data such as stream data, coded data, and decoded data, and is connected to the memory input/output unit 309.

The bus 307 transfers data such as stream data Strd showing audio and images and decoded data of audio and images. The stream input/output unit 311 obtains the stream data Strd, and is connected to the bus 307.

The image coding/decoding unit 301 performs coding and decoding of images, and is connected to the bus 307.

Here, the image coding/decoding unit 301 includes the image decoding apparatus 100, 100a, or 100b in the first embodiment and the image coding apparatus 200 in the second embodiment. The stream data Strd includes the coded stream Str shown in FIG. 1 or the output data 220 and 221 shown in FIG. 12. Furthermore, a signal between the memory 310 and the AV processing unit 300 includes the decoded image data 120 and 121 shown in FIG. 1 or the moving image data Pin shown in FIG. 12. The decoded image data 120 and 121 or the moving image data Pin shown in FIG. 12 may be included in an image signal VSig input in the image input/output unit 303.

The image processing unit 304 performs pre-processing and post-processing on the image signal VSig, and is connected to the bus 307. The image input/output unit 303 outputs the image signal VSig processed by the image processing unit 304 or only passed through the image processing unit 304 without being processed, to outside. Alternatively, the image input/output unit 303 receives the image signal VSig from outside.

The audio processing unit 306 performs pre-processing and post-processing on an audio signal ASig, and is connected to the bus 307. The audio input/output unit 305 outputs the audio signal ASig processed by the audio processing unit 306 or only passed through the audio processing unit 306 without being processed, to outside. Alternatively, the audio input/output unit 305 receives the audio signal ASig from outside. The AV control unit 308 controls the whole AV processing unit 300.

In a coding process, first, the image signal VSig is input in the image input/output unit 303 and the audio signal ASig is input in the audio input/output unit 305.

In a recording process, filtering, feature quantity extraction for coding, and the like are performed in the image processing unit 304 using the image signal VSig input in the image input/output unit 303. The image signal VSig is then stored in the memory 310 via the memory input/output unit 309 as an original image. Following this, the original image data and reference image data are transferred from the memory 310 to the image coding/decoding unit 301 via the memory input/output unit 309 again. Conversely, a divided coded stream and local decoded image data as a result of coding in the image coding/decoding unit 301 are transferred from the image coding/decoding unit 301 to the memory 310.

Meanwhile, filtering, feature quantity extraction for coding, and the like are performed in the audio processing unit 306 using the audio signal ASig input in the audio input/output unit 305. The audio signal ASig is then stored in the memory 310 via the memory input/output unit 309 as original audio data. Following this, the original audio data is retrieved from the memory 310 via the memory input/output unit 309 again, and the retrieved original audio data is coded. The coding result is stored again in the memory 310 as audio stream data.

At the end of the coding process, the image stream, the audio stream, and other stream information are processed as one set of stream data, and the stream data Strd is output via the stream input/output unit 311. Subsequently, a process of writing the stream data Strd onto a mass storage device such as an optical disc (for example, a DVD) or a hard disk (HDD) is carried out.

Next, the following operation is performed in a decoding process. First, the data stored in the recording process is read from the mass storage device such as an optical disc, a hard disk, or a semiconductor memory. As a result, the audio and image signals are input via the stream input/output unit 311 as the stream data Strd. From the stream data Strd, the image stream is input in the image coding/decoding unit 301, and the audio stream is input in the audio coding/decoding unit 302.

Image data decoded by the image coding/decoding unit 301 is temporarily stored in the memory 310 via the memory input/output unit 309. The data stored in the memory 310 is subject to processing such as noise removal in the image processing unit 304. The image data stored in the memory 310 may also be used as a reference picture for inter-picture motion compensation prediction in the image coding/decoding unit 301 again.

Audio data decoded by the audio coding/decoding unit 302 is temporarily stored in the memory 310 via the memory input/output unit 309. The data stored in the memory 310 is subject to processing such as acoustic treatment in the audio processing unit 306.

Lastly, while time-synchronizing the audio and the image, the data processed in the image processing unit 304 is output as the image signal VSig via the image input/output unit 303 and displayed on a television screen or the like, and the data processed in the audio processing unit 306 is output as the audio signal ASig via the audio input/output unit 305 and output from a speaker or the like.

Note that, though the AV processing unit 300 is constructed as one LSI circuit in this embodiment, the AV processing unit 303 may be constructed as a plurality of LSI circuits. In such a case, the first decoding circuit 101, the second decoding circuit 102, the first coding circuit 201, or the second coding circuit 202 in the first and second embodiments described above may be separately included in each LSI circuit.

Although the image decoding apparatus and the image coding apparatus according to the present invention have been described by way of the aforementioned first and second embodiments and variations, the present invention is not limited to such.

Note that hereafter the first and second decoding circuits and the first and second coding circuits are collectively referred to as first and second processing circuits (or simply as processing circuits), and decoding and coding are collectively referred to as codec processing. In addition, in the case where there is no need to distinguish a coded picture and a picture of an original image, the coded picture is simply referred to as a picture.

For instance, in the aforementioned first and second embodiments and variations, when each processing circuit performs codec processing on macroblocks in parallel, each processing circuit sequentially codec-processes macroblocks along the horizontal direction like raster scanning. However, macroblocks may be sequentially codec-processed along the vertical direction. In this case, the division unit divides a picture so that a division boundary line is along the horizontal direction. As a result, for example, two divided pictures generated by dividing the picture are in a state of being arranged above and below in the vertical direction, where the above divided picture and the below divided picture are codec-processed in parallel.

Moreover, the division unit may adaptively switch the division direction, that is, the boundary line direction, according to the direction corresponding to the order of macroblocks that are codec-processed by the processing circuits. Furthermore, though the aforementioned first and second embodiments and variations describe the case where the division unit divides the picture so that the left region and the right region have the same size, these regions may have different sizes. As an example, the division unit causes the left region and the right region to have different sizes according to the contents of the picture so that the times for the first processing circuit and the second processing circuit to decode the regions assigned to them are equal to each other. The division unit may also interchange the regions assigned to the first processing circuit and the second processing circuit, according to the contents of the picture. As an example, the division unit changes from a state where the left divided coded picture is decoded by the first decoding circuit and the right divided coded picture is decoded by the second decoding circuit, to a state where the left divided coded picture is decoded by the second decoding circuit and the right divided coded picture is decoded by the first decoding circuit. Moreover, instead of providing the division unit in each of the image decoding apparatus and the image coding apparatus, each processing circuit may extract the region associated with the processing unit from the picture and decode the extracted region. In such a case, a control unit that designates the region to be extracted for each processing circuit to thereby cause the processing circuit to extract the region may be included in the image decoding apparatus or the image coding apparatus.

Moreover, though the picture is divided into two regions and codec-processed in the aforementioned first and second embodiments and variations, the picture may be divided into three or more regions and codec-processed in parallel. In this case, the image decoding apparatus or the image coding apparatus includes three or more processing circuits.

Moreover, though the picture is codec-processed according to the coding system of H.264 in the aforementioned first and second embodiments and variations, the present invention is not limited to this coding system, and any coding system may be used so long as it performs codec-processing by referencing adjacent macroblock information.

Moreover, in the aforementioned first and second embodiments, the information transfer bus is provided as one bus capable of bidirectionally transferring information such as left neighborhood information or right neighborhood information between the processing circuits. However, the information transfer bus may instead be made up of a plurality of buses each of which is capable of unidirectional transfer. In addition, the means of passing left neighborhood information or right neighborhood information between the processing circuits is not limited to such an information transfer bus, and may for example be the plurality of memory banks shared by the plurality of processing circuits or the means of adding left neighborhood information or right neighborhood information to all or part of a stream and processing the stream, as in the first and second variations in the first embodiment. Any means or structure is applicable so long as it allows these information to be passed between the processing circuits.

Moreover, in the aforementioned first and second embodiments, each of the image decoding apparatus and the image coding apparatus includes one integrated circuit (for example, LSI) having the first processing circuit and the first transfer completion detection unit and one integrated circuit having the second processing circuit and the second transfer completion detection unit. However, each of the processing circuit and the transfer completion detection unit may separately be implemented on one chip, or all or part of the components included in the apparatus may be implemented on one chip so as to include all or part of the components. In the case of implementing all components on one chip, the image decoding apparatus and the image coding apparatus are each realized as a system integrated within single LSI. Alternatively, only the means of storing coding or decoding target data from among the components may be realized as a separate structure, instead of being implemented on one chip.

Though LSI is mentioned as the integrated circuit here, the integrated circuit may be called any of an IC (Integrated Circuit), system LSI, super LSI, or ultra LSI depending on the degree of integration. Moreover, the integrated circuit method is not limited to LSI, and may be realized by a dedicated circuit or a general-purpose processor. A FPGA (Field Programmable Gate Array) that can be programmed after LSI manufacturing or a reconfigurable processor capable of reconfiguring connections and settings of circuit cells inside LSI may also be used. Furthermore, when an integrated circuit technique that replaces LSI emerges from advancement of semiconductor technologies or other derivative technologies, such a technique can be used for the functional block integration. For instance, biotechnology may potentially be adapted in this way.

The image decoding apparatus and the image coding apparatus according to the present invention are not limited to the aforementioned first and second embodiments and variations. Applying various changes conceivable by a person skilled in the art to the embodiments and combining components or processing methods in the different embodiments and variations are also included in the scope of the present invention without departing from the principles of the present invention.

Note that the present invention can be realized not only as an apparatus, but also as a method including steps that correspond to processes performed by components included in the apparatus, as a program for causing a computer to execute these steps, as a computer readable recording medium such as a CD-ROM on which the program is recorded, and as information, data, or a signal showing the program. Such program, information, data, and signal may be distributed via a communication network such as the Internet.

INDUSTRIAL APPLICABILITY

The image decoding apparatus and the image coding apparatus according to the present invention have the advantages of suppressing overhead of parallel processing to improve parallelization efficiency and reducing circuit costs. For example, the image decoding apparatus and the image coding apparatus according to the present invention can be applied to a mobile phone and a personal computer having photography and image reproduction functions, an image recording/reproduction apparatus, and the like.

NUMERICAL REFERENCES

100 Image decoding apparatus
101 First decoding circuit
102 Second decoding circuit
103 Information transfer bus
104 First transfer completion detection unit
105 Second transfer completion detection unit
120, 121 Decoded image data
130 Division unit
201 First coding circuit
202 Second coding circuit
203 Information transfer bus
204 First transfer completion detection unit
205 Second transfer completion detection unit
230 Division unit

The invention claimed is:

1. An image decoding apparatus that decodes a coded picture composed of blocks, on a block-by-block basis, said image decoding apparatus comprising:
a processor; and
a non-transitory memory having stored thereon executable instructions, which when executed by said processor, cause said processor to perform:
decoding, by a plurality of decoding circuits, images of regions in the coded picture that are each associated with a different one of the plurality of decoding circuits, by repeating decoding of a decoding target block by referencing information on an already decoded block in a neighborhood of the decoding target block as neighborhood information, the already decoded block being included in the coded picture including the decoding target block;
transferring, for each of the plurality of decoding circuits, neighborhood information that is to be referenced by the decoding circuit and is generated by another one of the plurality of decoding circuits, from the other decoding circuit to the decoding circuit as transfer target neighborhood information; and
detecting, for each of the plurality of decoding circuits, whether or not the transfer target neighborhood information that is to be referenced when decoding a decoding target block positioned at an edge of a region associated with the decoding circuit has been transferred to the decoding circuit,
wherein a boundary line between the regions is along a vertical direction,
wherein in said decoding, each of the plurality of decoding circuits:
decodes the decoding target block in a horizontal direction in raster order;
decodes, when decoding a decoding target block positioned at a right end in the horizontal direction of the region associated with the decoding circuit, the decoding target block positioned at the right end by referencing the transfer target neighborhood information on a block positioned on a right of the decoding target block positioned at the right end, after the transfer target neighborhood information is generated by a different one of the plurality of decoding circuits and when detecting that the transfer target neighborhood information has been transferred to the decoding circuit; and
decodes, when decoding a decoding target block positioned at a left end in the horizontal direction of the region associated with the decoding circuit, the decoding target block positioned at the left end by referencing the transfer target neighborhood information on a block positioned on a left of the decoding target block positioned at the left end, after the transfer target neighborhood information is generated by a different one of the plurality of decoding circuits and when detecting that the transfer target neighborhood information has been transferred to the decoding circuit,
wherein the plurality of decoding circuits include a first decoding circuit and a second decoding circuit,
wherein said transferring includes transferring the transfer target neighborhood information generated by the first decoding circuit to the second decoding circuit and transferring the transfer target neighborhood information generated by the second decoding circuit to the first decoding circuit by (i) transferring the transfer target neighborhood information generated by the first decoding circuit to a first memory bank, (ii) transferring the transfer target neighborhood information generated by the second decoding circuit to a second memory bank, and (iii) performing bank switching between the first memory bank and the second memory bank to enable (a) the transfer target neighborhood information generated by the first decoding circuit to be shared by the second decoding circuit and (b) the transfer target neighborhood information generated by the second decoding circuit to be shared by the first decoding circuit, and
wherein said detecting includes (i) detecting that the transfer target neighborhood information generated by the first decoding circuit has been transferred to the second decoding circuit when the transfer target neighborhood information generated by the first decoding circuit is stored into the first memory bank and (ii) detecting that the transfer target neighborhood information generated by the second decoding circuit has been transferred to the first decoding circuit when the transfer target neighborhood information generated by the second decoding circuit is stored into the second memory bank.

2. The image decoding apparatus according to claim 1, wherein the executable instructions, when executed by said processor, further cause said processor to perform:
dividing a stream to be decoded by the plurality of decoding circuits.

3. An image decoding method for decoding a coded picture composed of blocks, on a block-by-block basis, said image decoding method comprising:
decoding, by a plurality of decoding circuits, images of regions in the coded picture that are each associated with a different one of the plurality of decoding circuits, by repeating decoding of a decoding target block by referencing information on an already decoded block in a neighborhood of the decoding target block as neighborhood information, the already decoded block being included in the coded picture including the decoding target block;
transferring, for each of the plurality of decoding circuits, neighborhood information that is to be referenced by the decoding circuit and is generated by another one of the plurality of decoding circuits, from the other decoding circuit to the decoding circuit as transfer target neighborhood information; and
detecting, for each of the plurality of decoding circuits, whether or not the transfer target neighborhood information that is to be referenced when decoding a decoding target block positioned at an edge of a region associated with the decoding circuit has been transferred to the decoding circuit,
wherein a boundary line between the regions is along a vertical direction, and
wherein in said decoding, each of the plurality of decoding circuits;
decodes the decoding target block in a horizontal direction in raster order;
decodes, when decoding a decoding target block positioned at a right end in the horizontal direction of the region associated with the decoding circuit, the decoding target block positioned at the right end by referencing the transfer target neighborhood information on a block positioned on a right of the decoding target block positioned at the right end, after the transfer target neighborhood information is generated by a different one of the plurality of decoding circuits and when detecting that the transfer target neighborhood information has been transferred to the decoding circuit; and
decodes, when decoding a decoding target block positioned at a left end in the horizontal direction of the region associated with the decoding circuit, the decoding target block positioned at the left end by referencing the transfer target neighborhood information on a block positioned on a left of the decoding target block positioned at the left end, after the transfer target neighborhood information is generated by a different one of the plurality of decoding circuits when detecting that the transfer target neighborhood information has been transferred to the decoding circuit,
wherein the plurality of decoding circuits include a first decoding circuit and a second decoding circuit,
wherein said transferring includes transferring the transfer target neighborhood information generated by the first decoding circuit to the second decoding circuit and transferring the transfer target neighborhood information generated by the second decoding circuit to the first decoding circuit by (i) transferring the transfer target neighborhood information generated by the first decoding circuit to a first memory bank, (ii) transferring the transfer target neighborhood information generated by the second decoding circuit to a second memory bank, and (iii) performing bank switching between the first memory bank and the second memory bank to enable (a) the transfer target neighborhood information generated by the first decoding circuit to be shared by the second decoding circuit and (b) the transfer target neighborhood information generated by the second decoding circuit to be shared by the first decoding circuit, and
wherein said detecting includes (i) detecting that the transfer target neighborhood information generated by the first decoding circuit has been transferred to the second decoding circuit when the transfer target neighborhood information generated by the first decoding circuit is stored into the first memory bank and (ii) detecting that the transfer target neighborhood information generated by the second decoding circuit has been transferred to the first decoding circuit when the transfer target neighborhood information generated by the second decoding circuit is stored into the second memory bank.

* * * * *